US012786485B2

(12) United States Patent
Hsu et al.

(10) Patent No.: US 12,786,485 B2
(45) Date of Patent: Nov. 3, 2026

(54) SERVER, METHOD AND COMPUTER PROGRAM

(71) Applicant: 17LIVE Japan INC., Tokyo (JP)

(72) Inventors: Yung-Chi Hsu, Taipei City (TW); Chi-Wei Lin, Taipei City (TW); Chin-Wei Liu, Taipei City (TW); Chia-Han Chang, Taipei City (TW); Hsing-Yu Tsai, Taipei City (TW)

(73) Assignee: 17LIVE Japan INC., Tokyo (JP)

( * ) Notice: Subject to any disclaimer, the term of this patent is extended or adjusted under 35 U.S.C. 154(b) by 89 days.

(21) Appl. No.: 18/884,600

(22) Filed: Sep. 13, 2024

(65) Prior Publication Data

US 2025/0126305 A1 Apr. 17, 2025

(30) Foreign Application Priority Data

Oct. 16, 2023 (JP) ................................ 2023-178184
Dec. 19, 2023 (JP) ................................ 2023-213852
Dec. 19, 2023 (JP) ................................ 2023-213853
Dec. 28, 2023 (JP) ................................ 2023-223539

(51) Int. Cl.
*H04N 21/2187* (2011.01)
*H04L 51/02* (2022.01)
*H04N 21/4788* (2011.01)

(52) U.S. Cl.
CPC ......... *H04N 21/2187* (2013.01); *H04L 51/02* (2013.01); *H04N 21/4788* (2013.01)

(58) Field of Classification Search
CPC . H04L 51/02; H04N 21/4788; H04N 21/2187
See application file for complete search history.

(56) References Cited

U.S. PATENT DOCUMENTS 11,165,725 B1 * 11/2021 Silverstein .............. H04L 51/04
11,580,350 B2 * 2/2023 Wu ..................... G06F 16/3329
2018/0121830 A1 5/2018 Schmid et al.
2020/0383623 A1 * 12/2020 Wu ......................... G06F 40/56
(Continued)

FOREIGN PATENT DOCUMENTS

CN 116600152 A 8/2023
JP 2003532220 A 10/2003
(Continued)

OTHER PUBLICATIONS

Office Action dated Nov. 26, 2024 of the corresponding Japan patent application No. 2023-213853.
(Continued)

*Primary Examiner* — Ngoc K Vu
(74) *Attorney, Agent, or Firm* — HDLS IPR SERVICES; Chun-Ming Shih

(57) ABSTRACT

A server comprising a circuitry, wherein the circuitry is configured to perform: generating a virtual chatbot via a machine learning model; determining an emotion of the virtual chatbot; feeding information of the emotion into the machine learning model; and setting the virtual chatbot in a live streaming room. According to the present disclosure, the communication between the viewers and AI V-Liver may be improved. Moreover, the quality of the live streaming platform with AI V-Livers may also be improved. Therefore, the user experience may also be improved.

11 Claims, 27 Drawing Sheets

(56) References Cited

U.S. PATENT DOCUMENTS

| | | | | |
|---|---|---|---|---|
| 2022/0179888 | A1* | 6/2022 | Wang | G06F 16/338 |
| 2022/0375467 | A1* | 11/2022 | Jin | G06F 16/3329 |
| 2023/0061778 | A1 | 3/2023 | Song et al. | |
| 2025/0142138 | A1* | 5/2025 | Zhang | H04N 21/4758 |

FOREIGN PATENT DOCUMENTS

| | | | | |
|---|---|---|---|---|
| JP | 2013543610 | A | | 12/2013 |
| JP | 2021007005 | A | | 1/2021 |
| JP | 2022106160 | A | | 7/2022 |
| JP | 2022114471 | A | | 8/2022 |
| JP | 2023010457 | A | | 1/2023 |
| JP | 2025050071 | A | * | 4/2025 |
| WO | 2017075017 | A1 | | 5/2017 |
| WO | 2021199198 | A1 | | 10/2021 |

OTHER PUBLICATIONS

Office Action dated Jun. 11, 2024 of the corresponding Japan patent application No. 2023-213852.

Notice of Allowance dated Apr. 22, 2024 of the corresponding Japan patent application No. 2023-223539.

* cited by examiner

Stream DB 310

| Stream ID | Distributor ID | Viewer ID |
|---|---|---|
| ST22 | 001A | SS5, SS12, SS43 |
| ST92 | 002B | TT3, TS2 |
| ... | ... | ... |

User DB 312

| User ID | Points |
|---|---|
| 001A | 3243 |
| 002B | 2510 |
| SS5 | 1803 |
| ... | ... |

FIG. 5

Gift DB 314

| Gift ID | Awarded points | Price points |
|---|---|---|
| TT01 | 90 | 100 |
| TE01 | 180 | 200 |
| WTS10 | 40 | 50 |
| ... | ... | ... |

FIG. 6

Character DB 324

| Character ID | Status tag | Video data | Audio data |
| --- | --- | --- | --- |
| CR1 | general | URL1v | URL1a |
| | positive | URL2v | URL2a |
| | negative | URL3v | URL3a |
| | ... | ... | ... |

FIG. 7

Comment DB 338

| Comment timing | Viewer ID | Comment content | Comment length | Time length from last chat | Topic similarity score | Viewer attribute score (ex. contribution score) | Priority score |
|---|---|---|---|---|---|---|---|
| t0 | V3 | Hi | 1 | NA | 17 | 158 | 26 |
| t1 | V1 | What is your favorite gift? | 5 | 67s | 28 | 3723 | 84 |
| t2 | V2 | Hey there | 2 | NA | 25 | 38630 | 94 |
| t3 | V3 | Ok let me send you a rocket | 7 | NA | 84 | 158 | 80 |
| t4 | V1 | How to send rocket? | 4 | 6s | 74 | 3723 | 74 |
| t5 | V4 | cool | 1 | NA | 19 | 826 | 17 |

FIG. 8

$$S = w1*TL + w2*CL + w3*TS + w4*TC + w5*CS$$
$$TL = 1/(T_{now} - T_{receive})$$
$$CL = min(len(comment), 50)/50$$
$$TC = 1/(T_{now} - T_{last})$$

Comment DB 338

| Timing | Reply content (chat content) | Simulation comment (expected comment) | Simulation comment vector | Viewer comment | Viewer comment vector | Topic similarity score |
|---|---|---|---|---|---|---|
| t0 | I am not happy today | Why are you not happy? | [0.43, 0.28, 0.63, ...] | You look cute | [0.18, 0.52, 0.12, ...] | 26 |
| t1 | | | | Why not happy? | [0.45, 0.27, 0.67, ...] | 86 |
| t2 | | | | I like your style | [...] | 28 |
| t3 | | | | Here I come! | [...] | 16 |
| t4 | Because it's too cold. | Wear more clothes. | [...] | What's your name? | [...] | 13 |
| t5 | | | [...] | ... | [...] | ... |

FIG. 10

Reply DB 340

| Priority score | Comment content | Reply content (ex. generated by LLM) | Reply status | Reply video data | Reply audio data |
|---|---|---|---|---|---|
| 86 | Why not happy? | Because it's too cold | negative | URL4v | URL4a |
| 79 | ... | ... | general | URL5v | URL5a |
| 67 | ... | ... | positive | URL6v | URL6a |
| 63 | ... | ... | ... | | |

FIG. 12

1320

| Stream ID | livestreamer ID | Viewer ID |
|---|---|---|
| ST22 | 001A | SS5, SS12, SS43 |
| ST92 | 002B | TT3, TS2 |
| ... | ... | ... |

FIG. 20

1322

| User ID | Point | Level | Status |
|---|---|---|---|
| 001A | 3243 | 10 | normal |
| SS5K | 1803 | 35 | VIP |
| ... | ... | ... | ... |

FIG. 21

1324

| AI V-Liver ID | Topic | Name | Motion ID | description | URL |
|---|---|---|---|---|---|
| AI017 | astrology | Kyoko | MO001 | smile | http://AI017.V-Liver |
| | | | MO002 | dance | |
| | | | ... | | |
| AI018 | politics | Mary | MO006 | wave | http://AI018.V-Liver |
| ... | | ... | ... | | |

FIG. 22

1326
| Context ID | Context event prompt | Context score |
|---|---|---|
| CT01 | You will have a big dinner with friends and you are looking forward | 2 |
| CT02 | You encountered a traffic jam and felt annoyed | -1 |
| CT03 | You feel tired and listless because you are not feeling well | -3 |
| ... | ... | ... |
FIG. 23
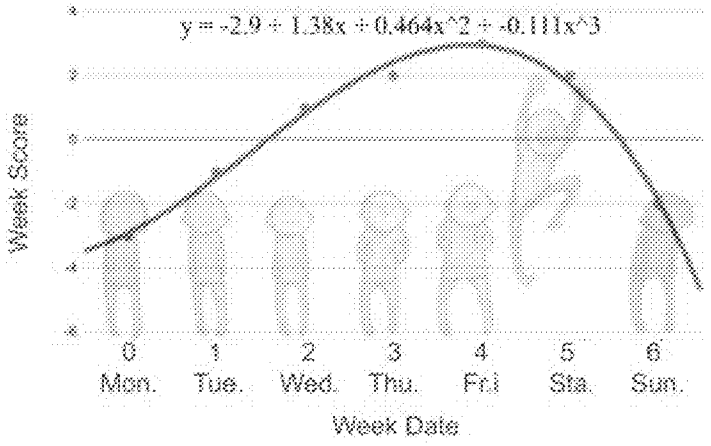
1328
FIG. 24
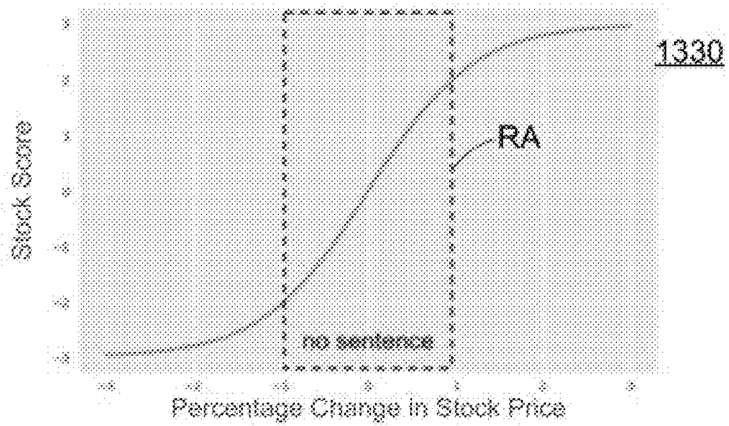
1330
FIG. 25

1332

| Total score | Emotion prompt |
|---|---|
| Total score > 3 | You are in a very good mood today.<br>You have to interact with the audience in a positive way. |
| 1 < total score < 3 | You are in a good mood today.<br>You have to use a happy mood to interact with the audience. |
| -1 < total score < 1 | You are in a normal mood today.<br>You have to use a clam tone to interact with the audience. |
| -3 < total score < -1 | You are in a bad mood today.<br>You have to use an unhappy tone to interact with the audience. |
| total score < -3 | You are in a very bad mood today.<br>You have to interact with the audience in a grumpy and impatient way. |

FIG. 26

| Stream ID | livestreamer ID | Viewer ID |
|---|---|---|
| ST22 | 001A | SS5, SS12, SS43 |
| ST92 | 002B | TT3, TS2 |
| ... | ... | ... |

2322

| User ID | Point | Level | Status |
|---|---|---|---|
| 001A | 3243 | 10 | normal |
| SS5K | 1803 | 35 | VIP |
| ... | ... | ... | ... |

FIG. 32

2324

| AI V-Liver ID | Topic | Name | Motion ID | description | URL |
|---|---|---|---|---|---|
| AI017 | astrology | Kyoko | MO001 | smile | http://AI017.V-Liver |
| | | | MO002 | dance | |
| | | | ... | | |
| AI018 | politics | Mary | MO006 | wave | http://AI018.V-Liver |
| ... | | ... | ... | | |

FIG. 33

2326

| Message ID | Description |
|---|---|
| SE002 | Say ugly for 100 times |
| SE003 | I am Taurus, tell me my fortune |
| SE004 | Tell me a joke |
| ... | ... |

FIG. 34

2332

| Emotion | Motion ID |
|---|---|
| Happy | MO001 |
| angry | MO002 |
| ... | ... |

FIG. 37

2328

| Memory ID | User ID | Data type | Data info | Format |
|---|---|---|---|---|
| MY002 | SS12 | Birthday | 2000/04/29 | {user ID: "SS12", "Birthday": 2000/04/29...} |
| MY003 | TT3 | Star sign | Taurus | {user ID: "TT3", "star sign": "Taurus"...} |
| MY004 | A0K2 | nickname | mickey | {user ID: "A0K2", "nickname": "mickey"...} |
| ... | ... | ... | ... | ... |

FIG. 35

2330

| Sentence | Model 1 x Dataset 1 | Model 2 x Dataset 2 |
|---|---|---|
| Hi, welcome to my live streaming room! what is your star sign? | happiness | positive-other |
| Sorry, I'm not an expert on history, I can only answer questions about constellations and animals. | neutral | neutral |
| Cockroaches are so disgusting, get away from me | angry | angry |
| ... | ... | ... |

FIG. 36

SERVER, METHOD AND COMPUTER PROGRAM

CROSS-REFERENCE TO RELATED APPLICATIONS

This application is based on and claims the benefit of priority from Japanese Patent Application Serial No. 2023-178184 (filed on Oct. 16, 2023), No. 2023-223539 (filed on Dec. 28, 2023), No. 2023-213852 (filed on Dec. 19, 2023) and No. 2023-213853 (filed on Dec. 19, 2023), the contents of which are hereby incorporated by reference in their entirety.

BACKGROUND OF THE DISCLOSURE

Technical Field

This disclosure relates to information and communication technology, and in particular, to a server, method and computer program in a live streaming.

Description of the Related Art

Real time interaction on the Internet, such as live streaming service, has become popular in our daily life. There are various platforms or providers providing the service of live streaming, and the competition is fierce. It is important for a platform to provide its users their desired services.

Chinese patent application publication Patent Document 1 discloses a system of virtual streamer.

Some APPs or platforms provide live streaming service for livestreamers and viewers to interact with each other. The livestreamers may have a performance to cheer up the viewer and the viewer may send gifts to support the livestreamers.

With the advancement of technology, AI models are now being applied to live streaming, and giving rise to AI virtual livestreamers. Patent Document 2 disclose a method to handle interaction from viewers with the AI virtual livestreamers.

However, the viewers may not feel involved if the interaction from the AI virtual livestreamers does not act like a real person. This may lead to poor user experience. Therefore, how to improve the user experience is very important.

[Patent Document 1]: CN 116600152A

[Patent Document 2]: US20230061778A

SUMMARY OF THE DISCLOSURE

A method according to one embodiment of the present disclosure is a method for replying to comments being executed by one or a plurality of computers, and includes: obtaining a first comment; obtaining a second comment; obtaining parameters of the first comment; obtaining parameters of the second comment; determining a first priority score of the first comment according to the parameters of the first comment; determining a second priority score of the second comment according to the parameters of the second comment; and selecting the first comment or the second comment to reply to according to the first priority score and the second priority score.

A system according to one embodiment of the present disclosure is a system for replying to comments that includes one or a plurality of processors, and the one or plurality of computer processors execute a machine-readable instruction to perform: obtaining a first comment; obtaining a second comment; obtaining parameters of the first comment; obtaining parameters of the second comment; determining a first priority score of the first comment according to the parameters of the first comment: determining a second priority score of the second comment according to the parameters of the second comment; and selecting the first comment or the second comment to reply to according to the first priority score and the second priority score.

A non-transitory computer-readable medium including a program for replying to comments, wherein the program causes one or a plurality of computers to execute: obtaining a first comment; obtaining a second comment; obtaining parameters of the first comment; obtaining parameters of the second comment; determining a first priority score of the first comment according to the parameters of the first comment; determining a second priority score of the second comment according to the parameters of the second comment; and selecting the first comment or the second comment to reply to according to the first priority score and the second priority score.

An embodiment of subject application relates to a server comprising a circuitry, wherein the circuitry is configured to perform: generating a virtual chatbot via a machine learning model; determining an emotion of the virtual chatbot; feeding information of the emotion into the machine learning model; and setting the virtual chatbot in a live streaming room.

Another embodiment of subject application relates to a method for providing live streams in a live streaming platform, comprising: generating a virtual chatbot via a machine learning model; determining an emotion of the virtual chatbot; feeding information of the emotion into the machine learning model; and setting the virtual chatbot in a live streaming room.

Another embodiment of subject application relates to a computer program for causing a server to realize the functions of: generating a virtual chatbot via a machine learning model; determining an emotion of the virtual chatbot; feeding information of the emotion into the machine learning model; and setting the virtual chatbot in a live streaming room.

According to the present disclosure, the communication between the viewers and AI V-Liver may be improved. Moreover, the quality of the live streaming platform with AI V-Livers may also be improved. Therefore, the user experience may also be improved.

An embodiment of subject application relates to a server comprising a circuitry, wherein the circuitry is configured to perform: generating a virtual chatbot via a machine learning model; setting the virtual chatbot in a live streaming room; receiving a comment from a user in the live streaming room; storing a keyword associated with the user in a first database in response to the keyword being detected from the comment; and feeding information of the first database into the machine learning model; wherein the keyword is related to information on the user.

Another embodiment of subject application relates to a method for providing live streams in a live streaming platform, comprising: generating a virtual chatbot via a machine learning model; setting the virtual chatbot in a live streaming room; receiving a comment from a user in the live streaming room; storing a keyword associated with the user in a first database in response to the keyword being detected from the comment; and feeding information of the first database into the machine learning model; wherein the keyword is related to information on the user.

Another embodiment of subject application relates to a computer program for causing a server to realize the functions of: generating a virtual chatbot via a machine learning model; setting the virtual chatbot in a live streaming room; receiving a comment from a user in the live streaming room; storing a keyword associated with the user in a first database in response to the keyword being detected from the comment; and feeding information of the first database into the machine learning model; wherein the keyword is related to information on the user.

According to the present disclosure, the communication between the viewers and AI V-Liver may be improved. Moreover, the quality of the live streaming platform with AI V-Livers may also be improved. Therefore, the user experience may also be improved.

BRIEF DESCRIPTION OF THE DRAWINGS

FIG. 5 is a data structure diagram showing an example of the user DB 312 of FIG. 3.

FIG. 6 is a data structure diagram showing an example of the gift DB 314 of FIG. 3.

FIG. 7 is a data structure diagram showing an example of the character DB 324.

FIG. 8 is a data structure diagram showing an example of the comment DB 338.

FIG. 10 is a data structure diagram showing an example of the comment DB 338.

FIG. 12 is a data structure diagram showing an example of the reply DB 340.

FIG. 20 shows an exemplary data structure of the stream DB 1320 of FIG. 19.

FIG. 21 shows an exemplary data structure of the user DB 1322 of FIG. 19.

FIG. 22 shows an exemplary data structure of the AI V-Liver DB 1324 of FIG. 19.

FIG. 23 shows an exemplary data structure of the context model 1326 of FIG. 19.

FIG. 24 shows an exemplary data structure of the week-date model 1328 of FIG. 19.

FIG. 25 shows an exemplary data structure of the stock model 1330 of FIG. 19.

FIG. 26 shows an exemplary data structure of daily emotion look-up table 1332 of FIG. 19.

FIG. 32 shows an exemplary data structure of the user DB 2322 of FIG. 30.

FIG. 33 shows an exemplary data structure of the AI V-Liver DB 2324 of FIG. 30.

FIG. 34 shows an exemplary data structure of the short-term memory DB 2326 of FIG. 30.

FIG. 35 shows an exemplary data structure of the long-term memory DB 2328 of FIG. 30.

FIG. 36 shows an exemplary data structure of the emotion analysis model 2330 of FIG. 30.

FIG. 37 shows an exemplary data structure of motion look-up table 2332 of FIG. 30.

DETAILED DESCRIPTION

Hereinafter, the identical or similar components, members, procedures or signals shown in each drawing are referred to with like numerals in all the drawings, and thereby an overlapping description is appropriately omitted. Additionally, a portion of a member which is not important in the explanation of each drawing is omitted.

A virtual streamer (or virtual liver, virtual livestreamer, virtual distributor, virtual anchor, etc.) is a virtual character (such as an animated character) that can interact or communicate with viewers, in a live stream room provided by a live streaming platform. In some embodiments, there is no real person streamer behind or controlling the virtual character, and the virtual character interacts with viewers on its own. The virtual character may digest comments from viewers and reply with action, voice or text messages. It is desirable to have a virtual character that can reply to viewers' comments like a real human, instead of replying to each comment one by one like a robot. A virtual streamer utilizing AI or machine learning technology could be referred to as an AiVLiver.

Figure 1:
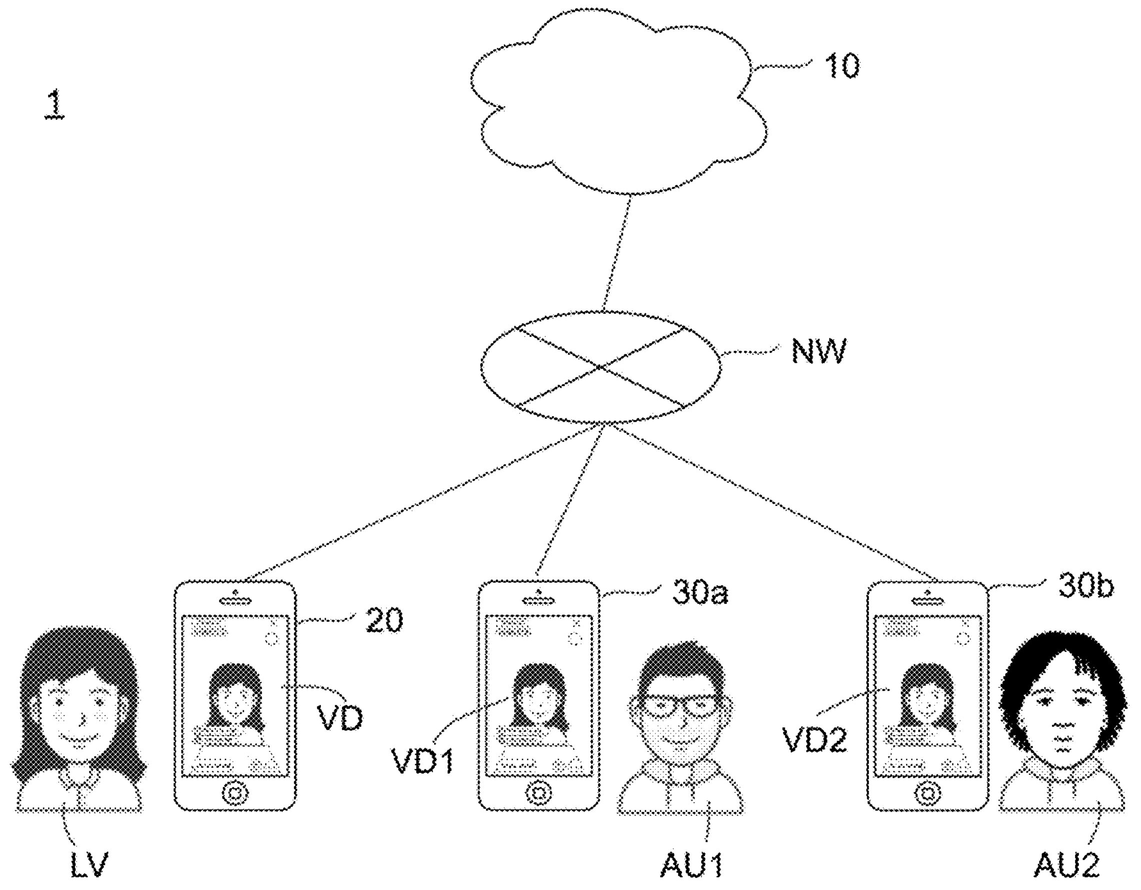
FIG. 1 shows a schematic configuration of a live streaming system 1 according to some embodiments of the present disclosure.

FIG. 1 shows a schematic configuration of a live streaming system 1 according to some embodiments of the present disclosure. The live streaming system 1 provides a live streaming service for the streaming streamer (could be referred to as liver, anchor, distributor, or livestreamer) LV and viewer (could be referred to as audience) AU (AU1, AU2 . . . ) to interact or communicate in real time. As shown in FIG. 1, the live streaming system 1 includes a server 10 (10, 110, 210 . . . ), a user terminal 20 and user terminals 30 (30*a*, 30*b* . . . ). In some embodiments, the streamers and viewers may be collectively referred to as users. The server 10 may include one or a plurality of information processing devices connected to a network NW. The user terminal 20 and 30 may be, for example, mobile terminal devices such as smartphones, tablets, laptop PCs, recorders, portable gaming devices, and wearable devices, or may be stationary devices such as desktop PCs. The server 10, the user terminal 20 and the user terminal 30 are interconnected so as to be able to communicate with each other over the various wired or wireless networks NW.

The live streaming system 1 involves the distributor LV, the viewers AU, and an administrator (or an APP provider, not shown) who manages the server 10. The distributor LV is a person who broadcasts contents in real time by recording the contents with his/her user terminal 20 and uploading them directly or indirectly to the server 10. Examples of the contents may include the distributor's own songs, talks, performances, gameplays, and any other contents. The administrator provides a platform for live-streaming contents on the server 10, and also mediates or manages real-time interactions between the distributor LV and the viewers AU. The viewer AU accesses the platform at his/her user terminal 30 to select and view a desired content. During live-streaming of the selected content, the viewer AU performs operations to comment, cheer, or send gifts via the user terminal 30. The distributor LV who is delivering the content may respond to such comments, cheers, or gifts. The response is transmitted to the viewer AU via video and/or audio, thereby establishing an interactive communication.

The term "live-streaming" may mean a mode of data transmission that allows a content recorded at the user terminal 20 of the distributor LV to be played or viewed at the user terminals 30 of the viewers AU substantially in real time, or it may mean a live broadcast realized by such a mode of transmission. The live-streaming may be achieved using existing live delivery technologies such as HTTP Live Streaming, Common Media Application Format, Web Real-Time Communications, Real-Time Messaging Protocol and MPEG DASH. Live-streaming includes a transmission mode in which the viewers AU can view a content with a specified delay simultaneously with the recording of the content by the distributor LV. As for the length of the delay, it may be acceptable for a delay with which interaction between the distributor LV and the viewers AU can be established. Note that the live-streaming is distinguished from so-called on-demand type transmission, in which the entire recorded data of the content is once stored on the server 10, and the server 10 provides the data to a user at any subsequent time upon request from the user.

The term "video data" herein refers to data that includes image data (also referred to as moving image data) generated using an image capturing function of the user terminals 20 or 30, and audio data generated using an audio input function of the user terminals 20 or 30. Video data is reproduced in the user terminals 20 and 30, so that the users can view contents. In some embodiments, it is assumed that between video data generation at the distributor's user terminal and video data reproduction at the viewer's user terminal, processing is performed onto the video data to change its format, size, or specifications of the data, such as compression, decompression, encoding, decoding, or transcoding. However, the content (e.g., video images and audios) represented by the video data before and after such processing does not substantially change, so that the video data after such processing is herein described as the same as the video data before such processing. In other words, when video data is generated at the distributor's user terminal and then played back at the viewer's user terminal via the server 10, the video data generated at the distributor's user terminal, the video data that passes through the server 10, and the video data received and reproduced at the viewer's user terminal are all the same video data.

In the example in FIG. 1, the distributor LV provides the live streaming data. The user terminal 20 of the distributor LV generates the streaming data by recording images and sounds of the distributor LV, and the generated data is transmitted to the server 10 over the network NW. At the same time, the user terminal 20 displays a recorded video image VD of the distributor LV on the display of the user terminal 20 to allow the distributor LV to check the live streaming contents currently performed.

The user terminals 30*a* and 30*b* of the viewers AU1 and AU2 respectively, who have requested the platform to view the live streaming of the distributor LV, receive video data related to the live streaming (may also be herein referred to as "live-streaming video data") over the network NW and reproduce the received video data to display video images VD1 and VD2 on the displays and output audio through the speakers. The video images VD1 and VD2 displayed at the user terminals 30*a* and 30*b*, respectively, are substantially the same as the video image VD captured by the user terminal 20 of the distributor LV, and the audio outputted at the user terminals 30*a* and 30*b* is substantially the same as the audio recorded by the user terminal 20 of the distributor LV.

Recording of the images and sounds at the user terminal 20 of the distributor LV and reproduction of the video data at the user terminals 30*a* and 30*b* of the viewers AU1 and AU2 are performed substantially simultaneously. Once the viewer AU1 types a comment about the contents provided by the distributor LV on the user terminal 30*a*, the server 10 displays the comment on the user terminal 20 of the distributor LV in real time and also displays the comment on the user terminals 30*a* and 30*b* of the viewers AU1 and AU2, respectively. When the distributor LV reads the comment and develops his/her talk to cover and respond to the comment, the video and sound of the talk are displayed on the user terminals 30*a* and 30*b* of the viewers AU1 and AU2, respectively. This interactive action is recognized as the establishment of a conversation between the distributor LV and the viewer AU1. In this way, the live streaming system 1 realizes the live streaming that enables interactive communication, not one-way communication.

Figure 2:
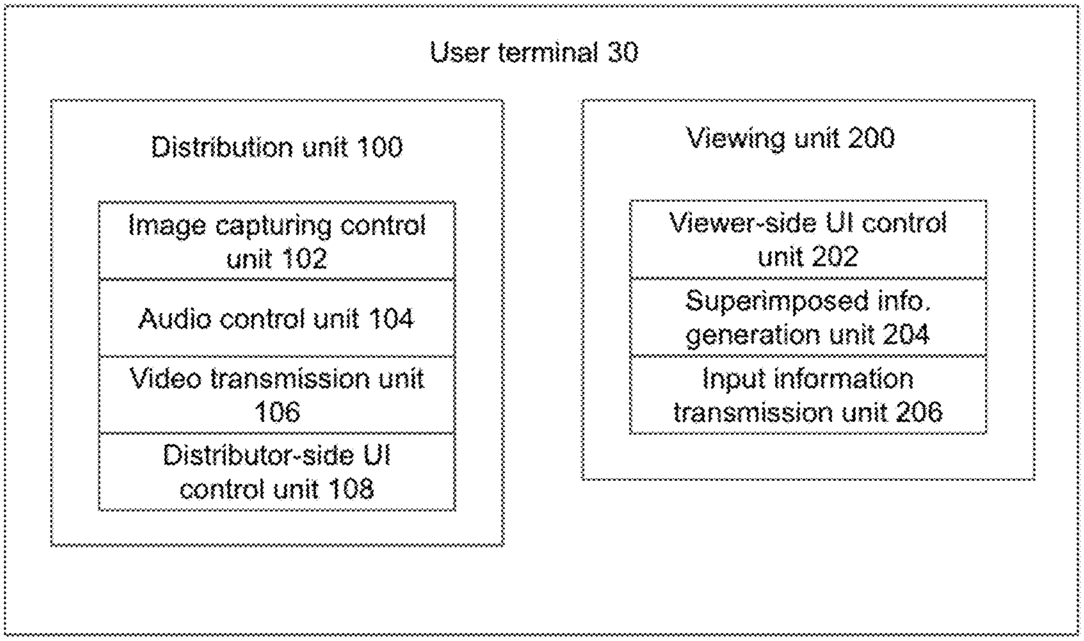
FIG. 2 is a block diagram showing functions and configuration of the user terminal 30 of FIG. 1 according to some embodiments of the present disclosure.

FIG. 2 is a block diagram showing functions and configuration of the user terminal 30 of FIG. 1 according to some embodiments of the present disclosure. The user terminal 20 has the same or similar functions and configuration as the user terminal 30. Each block in FIG. 2 and the subsequent block diagrams may be realized by elements such as a computer CPU or a mechanical device in terms of hardware, and can be realized by a computer program or the like in terms of software. Functional blocks could be realized by cooperative operation between these elements. Therefore, it is understood by those skilled in the art that these functional blocks can be realized in various forms by combining hardware and software.

The distributor LV and the viewers AU may download and install a live streaming application program (hereinafter referred to as a live streaming application) to the user terminals 20 and 30 from a download site over the network NW. Alternatively, the live streaming application may be pre-installed on the user terminals 20 and 30. When the live streaming application is executed on the user terminals 20 and 30, the user terminals 20 and 30 communicate with the server 10 over the network NW to implement or execute various functions. Hereinafter, the functions implemented by the user terminals 20 and 30 (processors such as CPUs) in which the live streaming application is run will be described as functions of the user terminals 20 and 30. These functions are realized in practice by the live streaming application on the user terminals 20 and 30. In some embodiments, these functions may be realized by a computer program that is written in a programming language such as HTML (HyperText Markup Language), transmitted from the server 10 to web browsers of the user terminals 20 and 30 over the network NW, and executed by the web browsers.

The user terminal 30 includes a distribution unit 100 and a viewing unit 200. The distribution unit 100 generates video data in which the user's (or the user side's) image and sound are recorded, and provides the video data to the server 10. The viewing unit 200 receives video data from the server 10 to reproduce the video data. The user activates the distribution unit 100 when the user performs live streaming, and activates the viewing unit 200 when the user views a video. The user terminal in which the distribution unit 100 is activated is the distributor's terminal, i.e., the user terminal that generates the video data. The user terminal in which the viewing unit 200 is activated is the viewer's terminal, i.e., the user terminal in which the video data is reproduced and played.

The distribution unit 100 includes an image capturing control unit 102, an audio control unit 104, a video transmission unit 106, and a distributor-side UI control unit 108. The image capturing control unit 102 is connected to a camera (not shown in FIG. 2) and controls image capturing performed by the camera. The image capturing control unit 102 obtains image data from the camera. The audio control unit 104 is connected to a microphone (not shown in FIG. 2) and controls audio input from the microphone. The audio control unit 104 obtains audio data through the microphone. The video transmission unit 106 transmits video data including the image data obtained by the image capturing control unit 102 and the audio data obtained by the audio control unit 104 to the server 10 over the network NW. The video data is transmitted by the video transmission unit 106 in real time. That is, the generation of the video data by the image capturing control unit 102 and the audio control unit 104, and the transmission of the generated video data by the video transmission unit 106 are performed substantially at the same time. The distributor-side UI control unit 108 controls an UI (user interface) for the distributor. The distributor-side control unit 108 may be connected to a display (not shown in FIG. 2), and displays a video on the display by reproducing the video data that is to be transmitted by the video transmission unit 106. The distributor-side UI control unit 108 may display an operation object or an instruction-accepting object on the display, and accepts inputs from the distributor who taps on the object.

The viewing unit 200 includes a viewer-side UI control unit 202, a superimposed information generation unit 204, and an input information transmission unit 206. The viewing unit 200 receives, from the server 10 over the network NW, video data related to the live streaming in which the distributor, the viewer who is the user of the user terminal 30, and other viewers participate. The viewer-side UI control unit 202 controls the UI for the viewers. The viewer-side UI control unit 202 is connected to a display and a speaker (not shown in FIG. 2), and reproduces the received video data to display video images on the display and output audio through the speaker. The state where the image is outputted to the display and the audio is outputted from the speaker can be referred to as "the video data is played". The viewer-side UI control unit 202 is also connected to input means (not shown in FIG. 2) such as touch panels, keyboards, and displays, and obtains user input via these input means. The superimposed information generation unit 204 superimposes a predetermined frame image on an image generated from the video data from the server 10. The frame image includes various user interface objects (hereinafter simply referred to as "objects") for accepting inputs from the user, comments entered by the viewers, and/or information obtained from the server 10. The input information transmission unit 206 transmits the user input obtained by the viewer-side UI control unit 202 to the server 10 over the network NW.

Figures 3, 4:
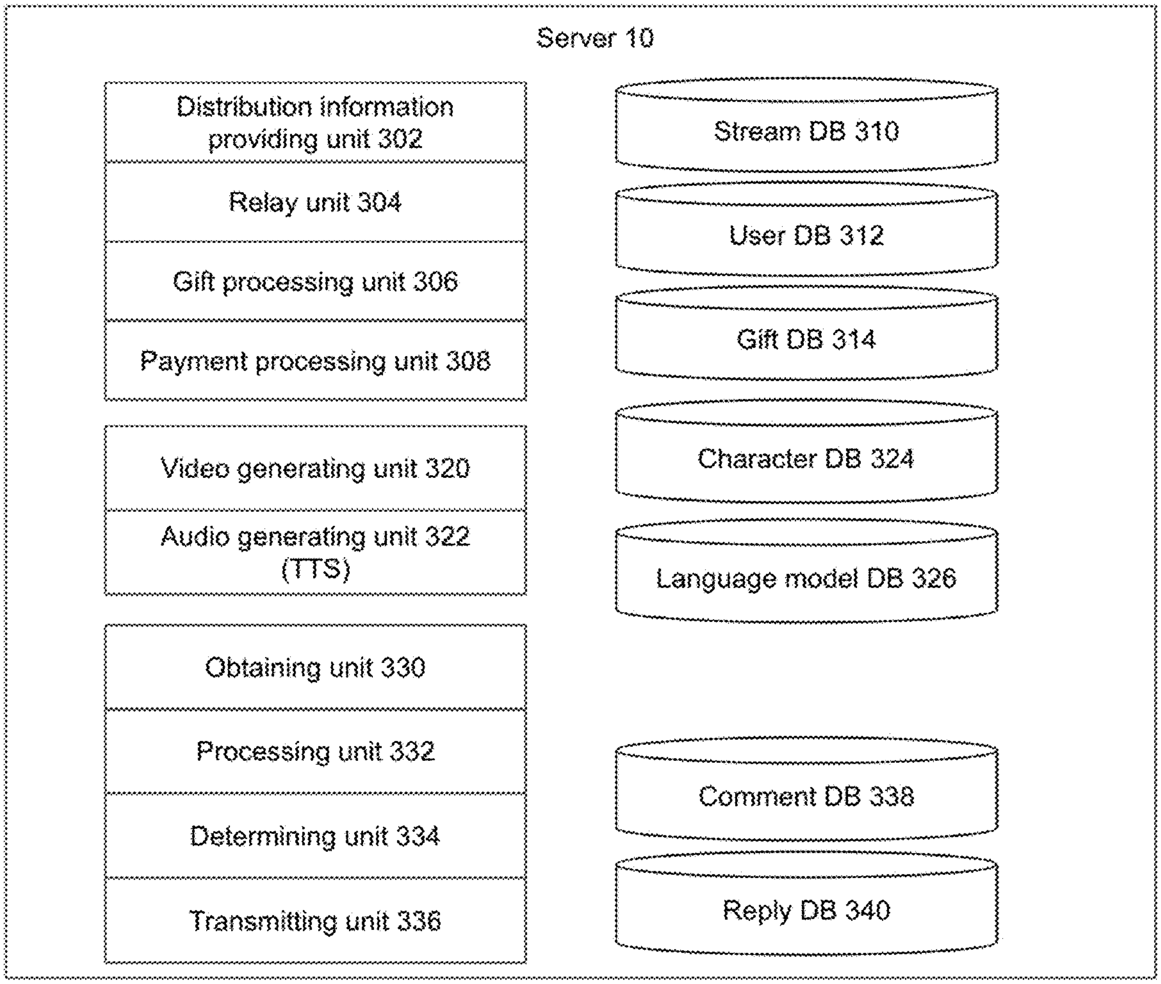
FIG. 3 shows a block diagram illustrating functions and configuration of the server of FIG. 1 according to some embodiments of the present disclosure.
FIG. 4 is a data structure diagram of an example of the stream DB 310 of FIG. 3.

FIG. 3 shows a block diagram illustrating functions and configuration of the server 10 of FIG. 1 according to some embodiments of the present disclosure. The server 10 includes a distribution information providing unit 302, a relay unit 304, a gift processing unit 306, a payment processing unit 308, a stream DB 310, a user DB 312, a gift DB 314, a video generating unit 320, an audio generating unit 322, a character DB 324, a language model DB 326, an obtaining unit 330, a processing unit 332, a determining unit 334, a transmitting unit 336, a comment DB 338, and a reply DB 340.

Upon reception of a notification or a request from the user terminal 20 on the distributor side to start a live streaming over the network NW, the distribution information providing unit 302 registers a stream ID for identifying this live streaming and the distributor ID of the distributor who performs the live streaming in the stream DB 310.

When the distribution information providing unit 302 receives a request to provide information about live streams from the viewing unit 200 of the user terminal 30 on the viewer side over the network NW, the distribution information providing unit 302 retrieves or checks currently available live streams from the stream DB 310 and makes a list of the available live streams. The distribution information providing unit 302 transmits the generated list to the requesting user terminal 30 over the network NW. The viewer-side UI control unit 202 of the requesting user terminal 30 generates a live stream selection screen based on the received list and displays it on the display of the user terminal 30.

Once the input information transmission unit 206 of the user terminal 30 receives the viewer's selection result on the live stream selection screen, the input information transmission unit 206 generates a distribution request including the stream ID of the selected live stream, and transmits the request to the server 10 over the network NW. The distribution information providing unit 302 starts providing, to the requesting user terminal 30, the live stream specified by the stream ID included in the received distribution request. The distribution information providing unit 302 updates the stream DB 310 to include the user ID of the viewer of the requesting user terminal 30 into the viewer IDs of (or corresponding to) the stream ID.

The relay unit 304 relays the video data from the distributor-side user terminal 20 to the viewer-side user terminal 30 in the live streaming started by the distribution information providing unit 302. The relay unit 304 receives from the input information transmission unit 206 a signal that represents user input by a viewer during the live streaming or reproduction of the video data. The signal that represents user input may be an object specifying signal for specifying an object displayed on the display of the user terminal 30. The object specifying signal may include the viewer ID of the viewer, the distributor ID of the distributor of the live stream that the viewer watches, and an object ID that identifies the object. When the object is a gift, the object ID is the gift ID. Similarly, the relay unit 304 receives, from the distribution unit 100 of the user terminal 20, a signal that represents user input performed by the distributor during reproduction of the video data (or during the live streaming). The signal could be an object specifying signal.

Alternatively, the signal that represents user input may be a comment input signal including a comment entered by a viewer into the user terminal 30 and the viewer ID of the viewer. Upon reception of the comment input signal, the relay unit 304 transmits the comment and the viewer ID included in the signal to the user terminal 20 of the distributor and the user terminals 30 of other viewers. In these user terminals 20 and 30, the viewer-side UI control unit 202 and the superimposed information generation unit 204 display the received comment on the display in association with the viewer ID also received.

The gift processing unit 306 updates the user DB 312 so as to increase the points of the distributor depending on the points of the gift identified by the gift ID included in the object specifying signal. Specifically, the gift processing unit 306 refers to the gift DB 314 to specify the points to be granted for the gift ID included in the received object specifying signal. The gift processing unit 306 then updates the user DB 312 to add the determined points to the points of (or corresponding to) the distributor ID included in the object specifying signal.

The payment processing unit 308 processes payment of a price of a gift from a viewer in response to reception of the object specifying signal. Specifically, the payment processing unit 308 refers to the gift DB 314 to specify the price points of the gift identified by the gift ID included in the object specifying signal. The payment processing unit 308 then updates the user DB 312 to subtract the specified price points from the points of the viewer identified by the viewer ID included in the object specifying signal.

FIG. 4 is a data structure diagram of an example of the stream DB 310 of FIG. 3. The stream DB 310 holds information regarding a live stream currently taking place. The stream DB 310 stores the stream ID, the distributor ID, and the viewer ID, in association with each other. The stream ID is for identifying a live stream on a live streaming platform provided by the live streaming system 1. The distributor ID is a user ID for identifying the distributor who provides the live stream. The viewer ID is a user ID for identifying a viewer of the live stream. In the live streaming platform provided by the live streaming system 1 of some embodiments, when a user starts a live stream, the user becomes a distributor, and when the same user views a live stream broadcast by another user, the user also becomes a viewer. Therefore, the distinction between a distributor and a viewer is not fixed, and a user ID registered as a distributor ID at one time may be registered as a viewer ID at another time.

FIG. 5 is a data structure diagram showing an example of the user DB 312 of FIG. 3. The user DB 312 holds information regarding users. The user DB 312 stores the user ID and the point, in association with each other. The user ID identifies a user. The point corresponds to the points the corresponding user holds. The point is the electronic value circulated within the live streaming platform. In some embodiments, when a distributor receives a gift from a viewer during a live stream, the distributor's points increase by the value corresponding to the gift. The points are used, for example, to determine the amount of reward (such as money) the distributor receives from the administrator of the live streaming platform. In some embodiments, when the distributor receives a gift from a viewer, the distributor may be given the amount of money corresponding to the gift instead of the points.

FIG. 6 is a data structure diagram showing an example of the gift DB 314 of FIG. 3. The gift DB 314 holds information regarding gifts available for the viewers in the live streaming. A gift is electronic data. A gift may be purchased with the points or money, or can be given for free. A gift may be given by a viewer to a distributor. Giving a gift to a distributor is also referred to as using, sending, or throwing the gift. Some gifts may be purchased and used at the same time, and some gifts may be purchased and then used at any time later by the purchaser viewer. When a viewer gives a gift to a distributor, the distributor is awarded the amount of points corresponding to the gift. When a gift is used, the use may trigger an effect associated with the gift. For example, an effect (such as visual or sound effect) corresponding to the gift will appear on the live streaming screen.

The gift DB 314 stores the gift ID, the awarded points, and the price points, in association with each other. The gift ID is for identifying a gift. The awarded points are the amount of points awarded to a distributor when the gift is given to the distributor. The price points are the amount of points to be paid for use (or purchase) of the gift. A viewer is able to give a desired gift to a distributor by paying the price points of the desired gift when the viewer is viewing the live stream. The payment of the price points may be made by an appropriate electronic payment means. For example, the payment may be made by the viewer paying the price points to the administrator. Alternatively, bank transfers or credit card payments may be used. The administrator is able to desirably set the relationship between the awarded points and the price points. For example, it may be set as the awarded points=the price points. Alternatively, points obtained by multiplying the awarded points by a predetermined coefficient such as 1.2 may be set as the price points, or points obtained by adding predetermined fee points to the awarded points may be set as the price points.

FIG. 7 is a data structure diagram showing an example of the character DB 324. The character DB 324 stores the character ID, the status tag, the video data, and the audio data, in association with each other.

The character ID identifies the virtual character. There could be multiple characters stored in the character DB 324.

The status tag indicates the status (or mood) of the character. For example, there could be a general (such as calm, peaceful, etc.) status, a positive (such as happy, excited, etc.) status, or a negative (such as sad, bored, etc.) status.

The video data stores the video source (or video data) corresponding to different status tags of the character. For example, URL1*v* is a URL corresponding to the video source of the character CR1 in the general status. URL2*v* is a URL corresponding to the video source of the character CR1 in the positive status.

The audio data stores the audio source (or audio data, or audio texture data, or intonation data) corresponding to different status tags of the character. For example, URL1*a* is a URL corresponding to the audio source of the character CR1 in the general status. URL2*a* is a URL corresponding to the audio source of the character CR1 in the positive status.

The video generating unit 320 is configured to generate stream video data according to the character video data from the character DB 324. For example, the video generating unit 320 may combine the character video with a background image (or background video) and generate the stream video data. For example, the video generating unit 320 may combine the character video with a real person streamer's live video and generate the stream video data.

In some embodiments, the video generating unit 320 may refer to the reply content of the character (in the reply DB 340) and adjust the character video data according to the reply content. For example, the video generating unit 320 may adjust the character's facial expression or mouth movement to align with the reply content, such that it looks like the character speaks like a real human. In some embodiments, the video generating unit 320 may select the video data in the character DB 324 according to the status tag in the character DB 324, which corresponds to the reply status of the reply content in the reply DB 340.

The audio generating unit 322 is configured to generate stream audio data according to the character audio data from the character DB 324. In some embodiments, the audio generating unit 322 may select the audio data in the character DB 324 according to the status tag in the character DB 324, which corresponds to the reply status of the reply content in the reply DB 340. The audio generating unit 322 may utilize the audio data and a text to speech (TTS) function to convert the reply content (which is text data) in the reply DB 340 into the stream audio data.

FIG. 8 is a data structure diagram showing an example of the comment DB 338. The comment DB 338 stores the comment timing, the viewer ID, the comment content, the comment length, the time length from last chat, the topic similarity score, the viewer attribute score, and the priority score, in association with each other.

The comment timing could be the timing of obtaining the comment. The viewer ID identifies the viewer making the comment. The comment content stores the content of the comment. The comment length is the length of the comment. In this embodiment, the word count is used as the comment length. In some embodiments, different calculation methods for the comment length could be used, such as using the number of total letters of the comment.

The "time length from last chat" identifies how close or how recent the character made a last chat (or a last reply) to the viewer who makes the comment. In some embodiments, the "time length from last chat" is the time length between the current timing and the timing of the last chat from the character to the viewer who makes the comment. The calculation is within the same live stream. Therefore, for a comment made by a viewer whom the character has not yet talked to (or replied to) in the stream, the value would be NA (not applied) or zero (in some embodiments) for that comment.

For example, the character has not yet replied to viewer V3 before the comment "Ok let me send you a rocket" made by viewer V3, therefore the value is NA. For example, there are 6 seconds between the current timing and a last chat from the character to viewer V1, who makes the comment "how to send rocket". The last chat could be a reply to the comment "what is your favorite gift" from viewer V1, and could be made by the character between t1 and t4. The time length from last chat may keep changing along with time.

In some embodiments, the time length from last chat could be calculated as the time length between obtaining the comment and the timing of a last chat from the character to the viewer who makes the comment. In that case, the values may not change with time.

The topic similarity score identities the similarity of the comment to a current topic from the character's perspective. The details and the calculation will be described later.

The viewer attribute score identifies the attribute of the viewer who makes the comment. In this embodiment, the viewer attribute score is the contribution score of the viewer with respect to the character. The contribution score may indicate how much the viewer has contributed to the character. The contribution score may be the total gift amount or the total gift value the viewer has made to the character. In some embodiments, the viewer attribute score could be the contribution score of the viewer with respect to other distributors or other characters. In some embodiments, the viewer attribute score could be the points (or deposit points) of the viewer on the streaming platform.

The priority score identifies the priority to reply to the comments from the character's perspective.

In some embodiments, the priority score increases as the comment timing is more recent. The mechanism makes the character resemble a real human distributor who tends to remember and react to the latest comments.

In some embodiments, the priority score increases as the comment length is longer. The mechanism makes the character resemble a real human distributor who tends to be attracted by and reply to the longer comments.

In some embodiments, the priority score increases as the "time length from last chat" is shorter. A shorter "time length from last chat" indicates a shorter time length between the current timing and the last timing the character talked to or replied to the viewer who makes the comment. The mechanism makes the character resemble a real human distributor who tends to react first to the viewer to whom the distributor just talked to recently. In some embodiments, a short "time length from last chat" means the viewer and the character are "thinking on the same page (or topic)".

In some embodiments, the priority score increases as the "topic similarity score" is higher. A higher topic similarity score may indicate the comment is in line with the current topic in the character's "mind". The mechanism makes the character resemble a real human distributor who tends to reply first to the comment that is closer to what the distributor is thinking. The details will be described later.

In some embodiments, the priority score increases as the "viewer attribute score" is higher (for example, viewer V2). For example, the priority score may be higher for a comment made by a viewer who has a higher contribution for the character. In some embodiments, the priority score may be higher for a comment made by a viewer who has a higher contribution for other distributors. In some embodiments, the priority score may be higher for a comment made by a viewer who has a higher deposit point. The mechanism makes the character resemble a real human distributor who tends to reply first to the comment that is made by a viewer who may have a higher contribution potential to the distributor.

Figure 9:
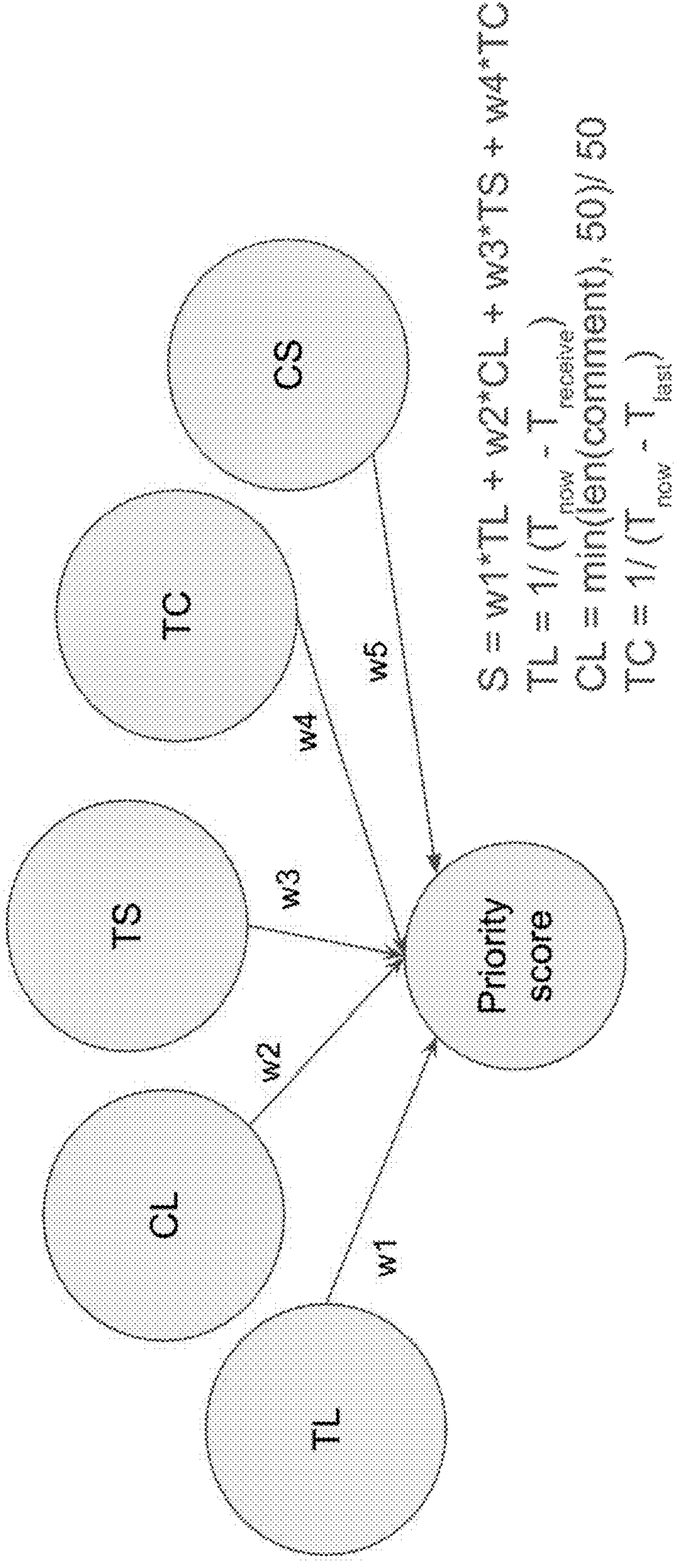
FIG. 9 shows an example of determining the priority score of a comment.

FIG. 9 shows an example of determining the priority score of a comment. As shown, the score [S] is determined according to parameters TL, CL, TS, TC, and CS.

TL is determined by the current timing [$T_{now}$] and the timing of receiving the comment [$T_{receive}$]. As shown, a greater TL indicates a more recent comment.

CL is determined by the comment length. For example, "len(comment)" could be the word count or the letter count of the comment. In this example, a comment with a length longer than 50 and a comment with a length equal to 50 would have the same CL value.

TS indicates the topic similarity score. A greater TS indicates the comment is more similar to (or more relevant to) the topic the character is currently "thinking". The calculation will be described later.

TC is determined by the current timing [$T_{now}$] and the last timing [$T_{last}$] the character talked to the viewer who makes the comment. As shown, the more recent the character replied to the viewer who makes the comment, the greater the TC value is. In some embodiments, TC is the reciprocal of the "time length from last chat".

CS is the contribution score of the viewer who makes the comment.

The weight values w1, w2, w3, w4 and w5 could be determined by the operator of the streaming platform according to actual practice. A higher weight value could be given to a factor which the operator intends to focus more on. In some embodiments, the calculation or determination of the priority score could be performed by the processing unit 332.

FIG. 10 is a data structure diagram showing an example of the comment DB 338. The comment DB 338 stores the timing, the reply content (or chat content), the simulation comment, the simulation comment vector, the viewer comment, the viewer comment vector, and the topic similarity score, in association with each other.

The reply content is the content of the reply (or chat/response/comment) from the character, at different timings. The reply content could be accessed from the reply DB 340.

The simulation comment could also be referred to as the expected comment, and is a simulated "potential (or possible) comment from a viewer with respect to the character's reply (or character's chat)". The simulation comment could be generated by inputting the character's reply content into a language model (such as ChatGPT). The language model could be included in the language model DB 326. In some embodiments, the language model could be implemented separately from the language model DB 326, and could be much lighter than the language model DB 326. The language model then generates a simulated comment to the reply. For example, in the embodiment of FIG. 10, the simulation comment "Why are you not happy?" is generated with respect to the character's chat "I am not happy today". In some embodiments, the execution of generating the simulation comment could be done by the processing unit 332.

The simulation comment vector is generated by inputting the simulation comment into a text-to-vector model (or converter). In some embodiments, the model could be or could include a Bidirectional Encoder Representations from Transformers (BERT) or a Sentence-BERT (SBERT) word embedding model. The model could be included in the language model DB 326. In some embodiments, the model could be different from the language model DB 326 and could be implemented outside the server 10. In some embodiments, the converting process could be performed by the processing unit 332.

The viewer comment stores comments from viewers at different timings.

The viewer comment vector is generated by inputting the viewer comment into the text-to-vector model (or converter). In some embodiments, the converting process could be performed by the processing unit 332.

The topic similarity score indicates how similar a viewer comment is to the simulation comment (or to the latest simulation comment). Various methods for calculating similarity scores could be used. For example, a dot product between the viewer comment vector and the simulation comment vector could be performed. For example, a correlation coefficient between the viewer comment vector and the simulation comment vector could be calculated. In this example, the viewer comment "Why not happy?" is the most similar comment to the simulation comment "Why are you not happy?", therefore it corresponds to the greatest topic similarity score. In some embodiments, the calculation process could be performed by the processing unit 332. In some embodiments, a higher topic similarity score indicates the comment (e.g., "why not happy?") is more relevant to the last chat/reply (e.g., I am not happy today.) of the character.

Figure 15:
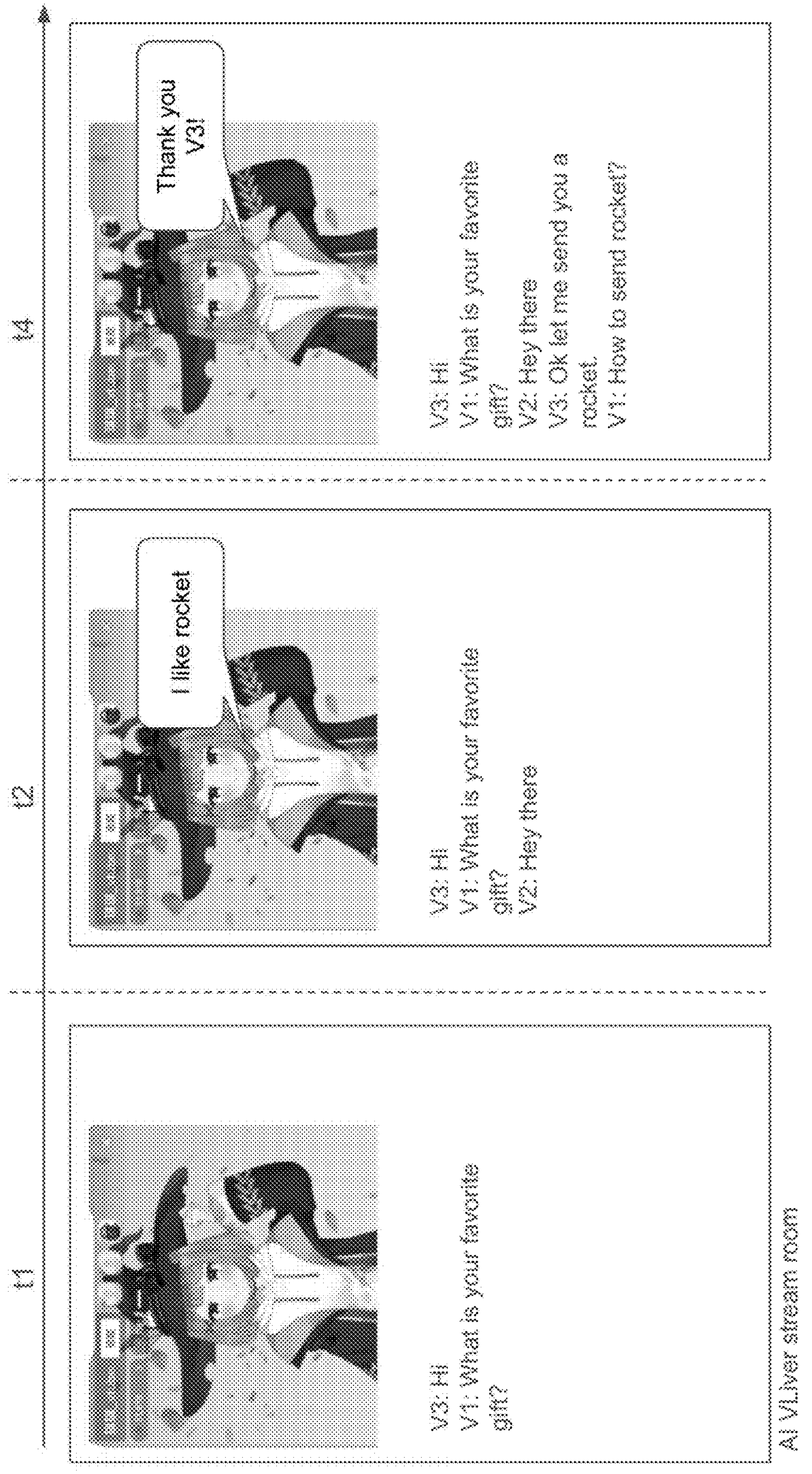
FIG. 15 shows an exemplary virtual character stream according to some embodiments of the present disclosure.

For example, in the embodiment shown in FIG. 8, the comment "Ok let me send you a rocket" has the highest topic similarity score. The reason could be that the character makes a reply such as "I like rocket" (as shown in FIG. 15) with respect to the comment "what is your favorite gift?". A simulation comment such as "I give you rocket" (not shown) would be generated with respect to that reply, and a subsequent viewer comment that is more relevant to the simulation comment has a higher topic similarity score.

Figure 11:
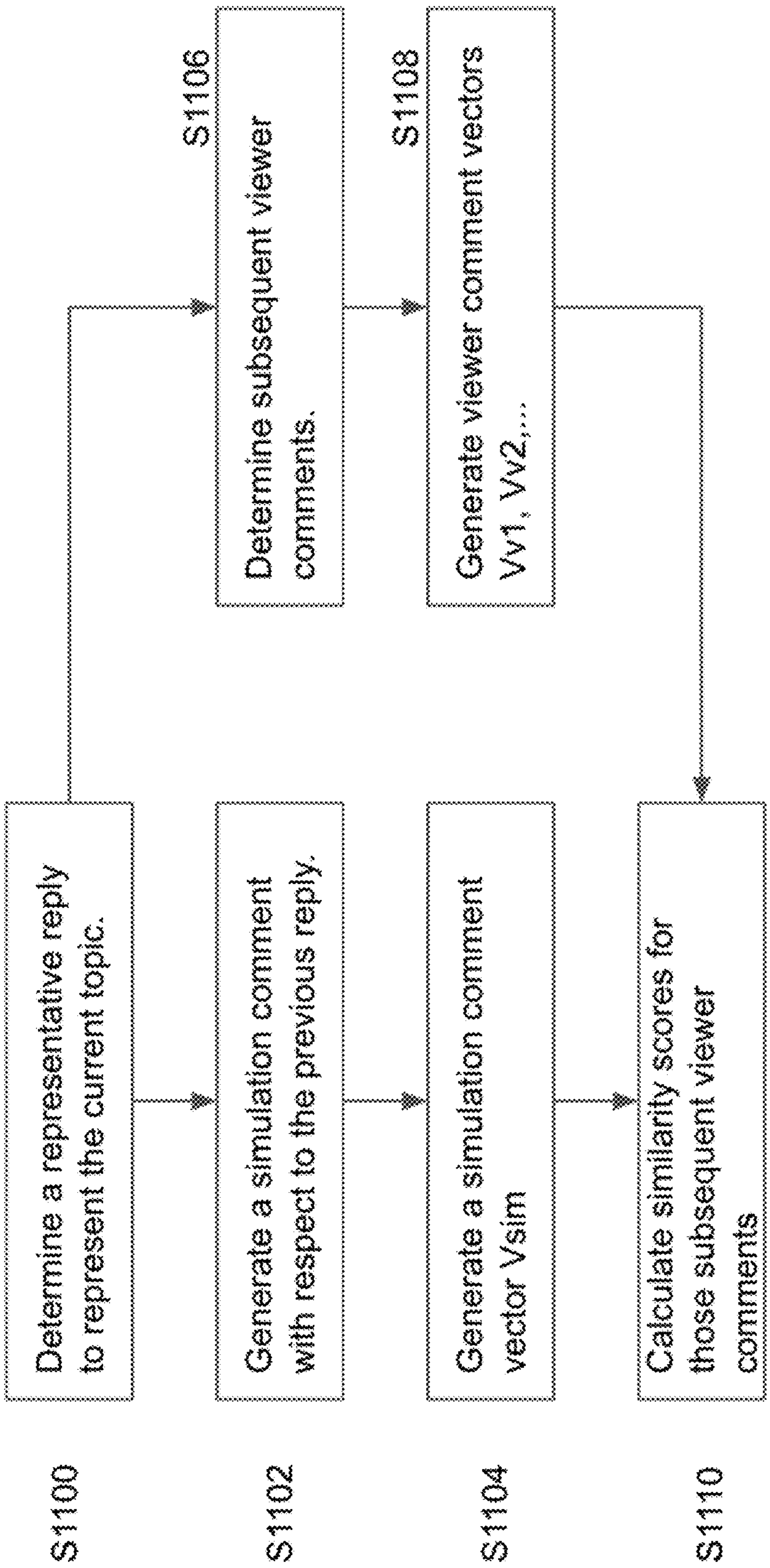
FIG. 11 shows an exemplary flowchart according to some embodiments of the present disclosure.

FIG. 11 shows an exemplary flowchart according to some embodiments of the present disclosure.

At step S1100, the determining unit 334 determines a representative reply (could be a previous chat) from the character to represent the current topic. In some embodiments, the determining unit 334 may choose the latest reply to represent the current topic. In some embodiments, the determining unit 334 may utilize the language model DB 326 to determine which reply (out of, for example, the most recent 5 replies) is the most representative of the current topic. In some embodiments, a rule based method (such as keyword matching) could be used to choose the representative reply.

At step S1102, the processing unit 332 generates a simulation comment (or simulation viewer comment) with respect to the representative reply.

At step S1104, the processing unit 332 generates a simulation comment vector Vsim from the simulation comment.

At step S1106, the determining unit 334 determines the subsequent viewer comments, which are comments from viewers obtained after the representative reply.

At step S1108, the processing unit 332 generates viewer comment vectors Vv1, Vv2, . . . from those subsequent viewer comments.

At step S1110, the processing unit 332 calculates the similarity score for each of those viewer comments to the simulation comment. The scores are then stored into the comment DB 338.

FIG. 12 is a data structure diagram showing an example of the reply DB 340. The reply DB 340 stores the priority score, the viewer comment content, the reply content, the reply status, the reply video data, and the reply audio data in association with each other.

The priority scores and the viewer comment contents could be obtained from the comment DB 338.

The reply content is the content the character replies to (or chats to) the viewer comment, and could be generated by inputting the comment into the language model DB 326. The language model DB 326 then generates the reply content with respect to the comment. The reply status is the status (or the mood) corresponding to the reply content, and could be generated concurrently with the reply content. For example, the language model DB 326 could be utilized to analyze the reply content and provide the corresponding reply status when it generates the reply content. The above processes could be performed by the processing unit 332, for example.

The reply video data is the stream video data generated by the video generating unit 320 according to the reply content and the reply status. The reply video data includes the character's visual reaction (or visual reply) to the corresponding viewer comment. The reply audio data is the stream audio data generated by the audio generating unit 322 according to the reply content and the reply status. The reply audio data includes the character's audio reaction (or audio reply) to the corresponding viewer comment.

The language model DB 326 may include one or more Large Language Models (LLM), such as GPT (Generative Pre-trained Transformer), LLaMA (Language Model for Many Applications), and/or BLOOM (BigScience Large Open-science Open-access Multilingual Language Model). Other language models could also be implemented in the language model DB 326.

The obtaining unit 330 may be configured to obtain viewer comments and to obtain/extract parameters of the viewer comments. For example, the obtaining unit 330 may be configured to obtain the comment timing, the viewer ID of the comment, the comment content, the comment length, the "time length from last chat", the topic similarity score, and/or the viewer attribute score.

The determining unit 334 may be configured to select (or determine) the comment to reply to according to the priority scores of the comments. The determining unit 334 may determine to reply to the comment with a higher priority score first. For example, when determining a first priority score of a first comment to be greater than a second priority score of a second comment, the determining unit 334 then determines to transmit a first reply to the first comment before transmitting a second reply to the second comment.

The transmitting unit 336 is configured to transmit the reply video data generated by the video generating unit 320 and the reply audio data generated by the audio generating unit 322 to user terminals of the viewers in the character's live stream. In some embodiments, the distribution information providing unit 302 and/or the relay unit 304 could be involved in the transmission.

Figure 13:
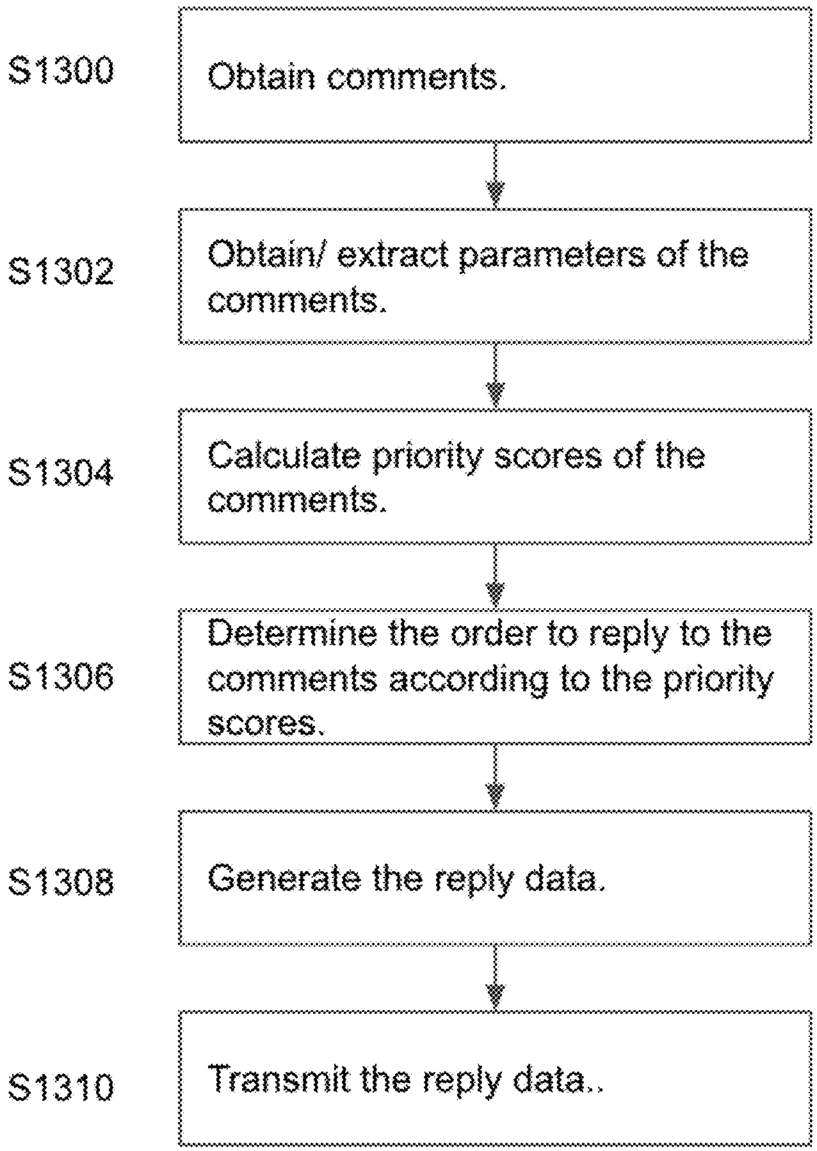
FIG. 13 shows an exemplary flowchart according to some embodiments of the present disclosure.

FIG. 13 shows an exemplary flowchart according to some embodiments of the present disclosure.

At step S1300, the obtaining unit 330 obtains comments from viewers in a character's live stream.

At step S1302, the obtaining unit 330 extracts parameters of the comments, such as the parameters in the comment DB 338.

At step S1304, the processing unit 332 calculates the priority score of each comment, according to each comment's parameters, and stores the priority scores into the comment DB 338.

At step S1306, the determining unit 334 determines the order to reply to the comments according to their priority scores.

At step S1308, the processing unit 332 generates the reply contents for the comments to be replied to. The reply video data and the reply audio data are then generated according to the reply contents. The reply video data and the reply audio data could be referred to reply data.

At step S1310, the reply video data and the reply audio data are transmitted to viewers in the character's stream.

In some embodiments, before or after generating the reply data, the determining unit 334 may determine whether or not the viewer to whom the reply data is directed to is still in the stream room. For example, if the determining unit 334 detects that the viewer already left the stream room before generating the reply data, the determining unit 334 may decide not to generate the reply data to save processing resources. For example, if the determining unit 334 detects that the viewer already left the stream room after generating the reply data but before transmitting the reply data, the determining unit 334 may decide not to transmit the reply data to save transmission resources.

In some embodiments, if the priority score of a comment is below a threshold, the determining unit 334 may decide to ignore and not to reply to the comment.

In some embodiments, the processing unit 332 may utilize the language model DB 326 to detect if a comment contains any harmful intention. The determining unit 334 may then decide to ignore the comment with harmful intention to prevent the harmful topic from continuing in the stream mom.

The present disclosure enables the character to reply to comments like a real human distributor. The present disclosure could be implemented in situations other than live streaming. For example, a non-live streaming platform, a replying service at an e-commerce site, an auto-messaging service, or any auto-replying customer service system could implement the features in the present disclosure.

Figure 14:
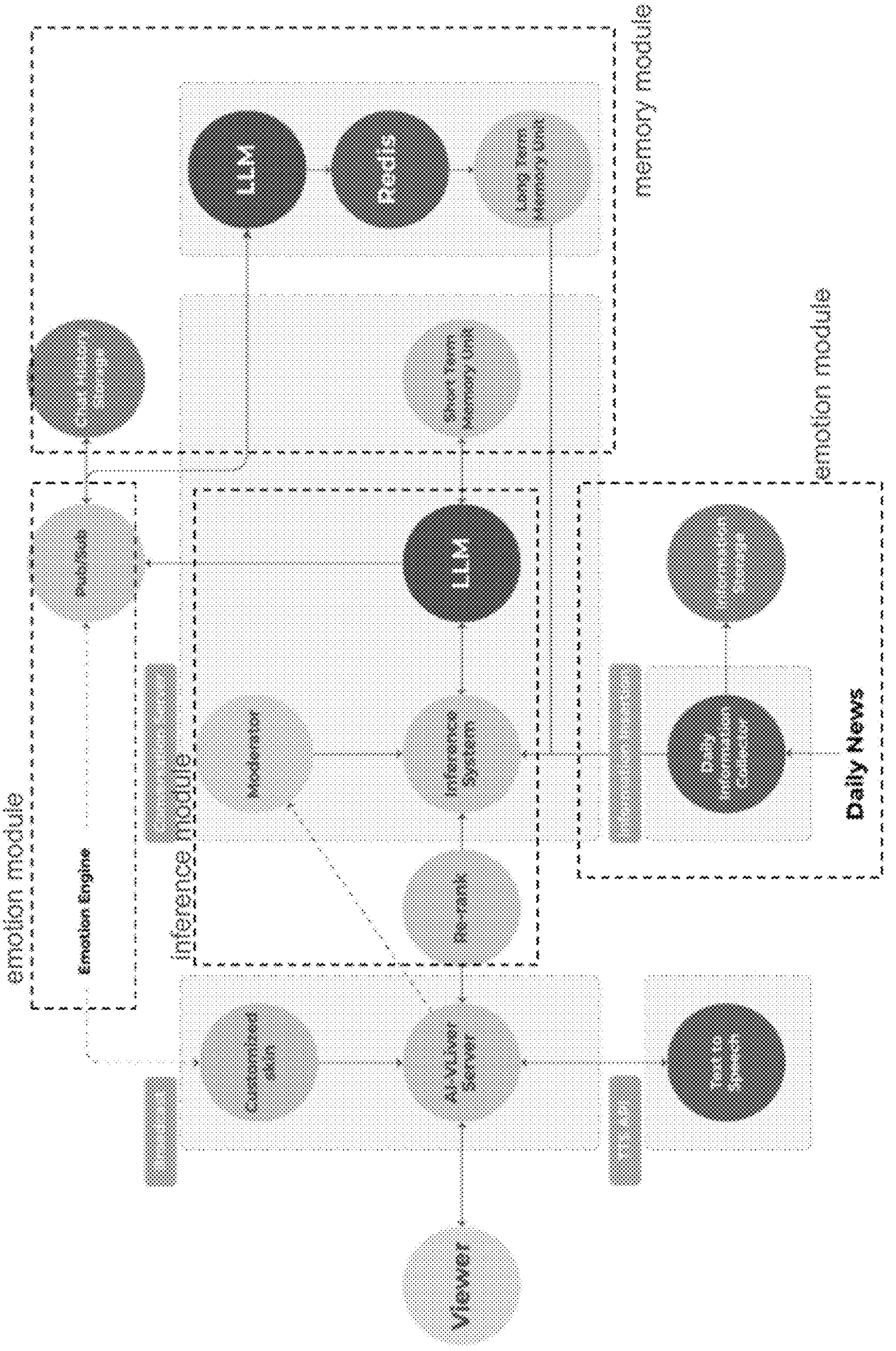
FIG. 14 shows an exemplary AI VLiver system according to some embodiments of the present disclosure.

FIG. 14 shows an exemplary AI VLiver system according to some embodiments of the present disclosure.

As shown, the system contains the AI VLiver server, the skin module, the text to speech module, the emotion module, the memory module, and the inference module.

The emotion module is configured to provide emotion for the character, which could be affected by daily news or stored information. The memory module is configured to provide memory for the character, and contains a short-term memory module and a long-term memory module.

The inference module is configured to generate responses for the character, and contains a re-rank module, an inference system, a moderator for practical adjustment, and an LLM model. The re-rank module is also referred to as a re-ordering module, and could utilize the present disclosure to decide the order to reply to comments from viewers. The inference system and the LLM model could be utilized to generate the reply contents.

FIG. 15 shows an exemplary virtual character stream according to some embodiments of the present disclosure. The conversions between the viewers and the character are similar to the embodiment in FIG. 8.

By the timing t1, the character obtains the comments from viewer V3 and viewer V1.

At timing t2, the character replies to viewer V1, ignoring the comment from viewer V3, because the priority score for the comment "Hi" is too low.

At timing t4, the character obtains new comments from viewer V3 and viewer V1. The character replies to viewer V3 because the comment "Ok let me send you a rocket" is more similar to the expected comment in the character's mind.

The live streaming system 1 according to some embodiments of subject application provides enhancement among the users to communicate and interact smoothly. More specifically, it entertains the viewers and livestreamers in a technical way.

Figure 17:
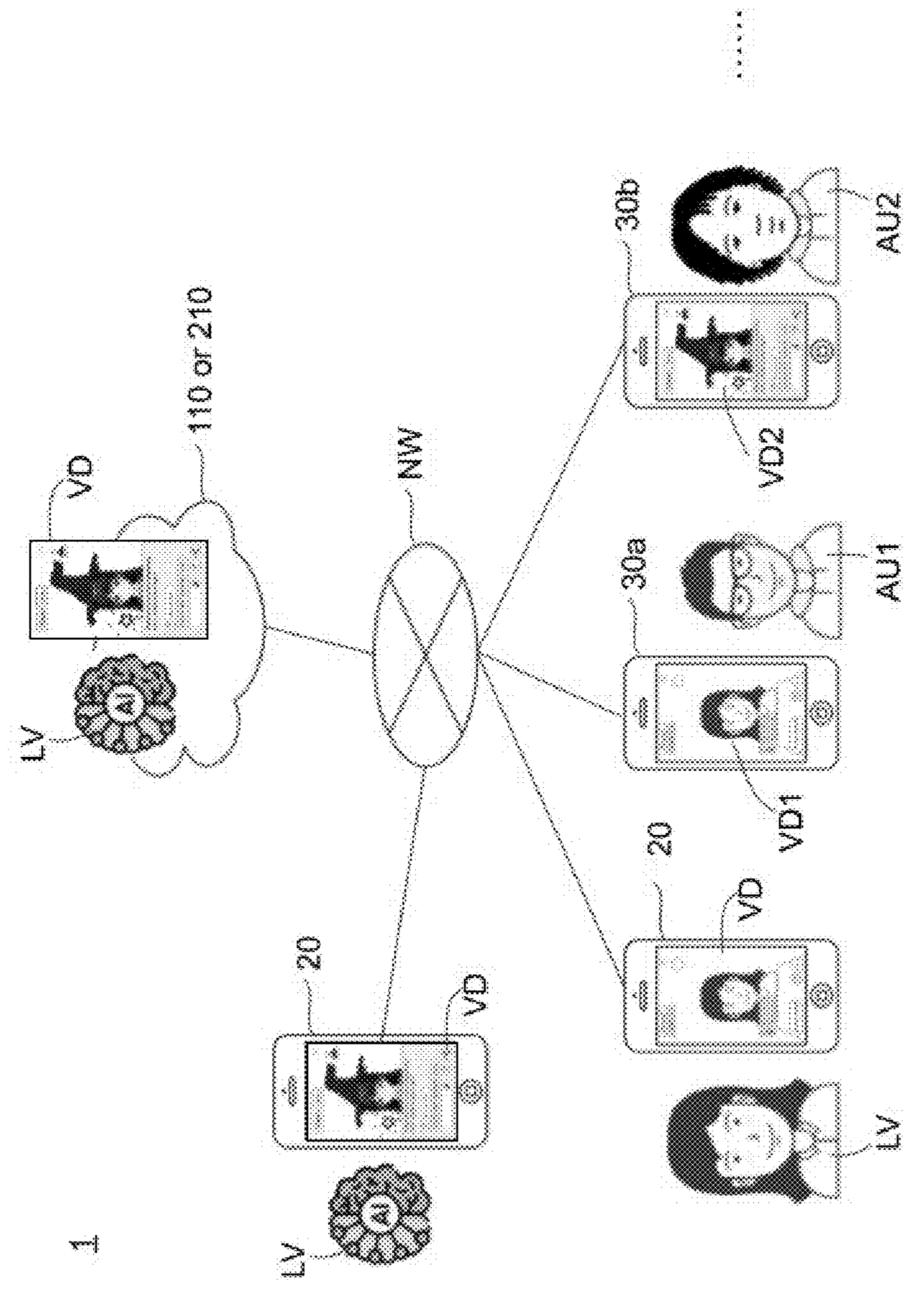
FIG. 17 is a schematic configuration of a live streaming system 1 according to some embodiments of subject application.

FIG. 17 shows a schematic configuration of a live streaming system 1 according to some embodiments of subject application. The live streaming system 1 provides a live streaming service for the streaming livestreamer (may also be referred as liver, streamer or distributor) LV and viewer (may also be referred as audience) AU (AU1, AU2 . . . ) to interact mutually in real time. As shown in FIG. 17, the live streaming system 1 may include a server 10 (10, 110, 210 . . . ), a user terminal 20 and a user terminal 30 (30*a*, 30*b* . . . ). The user terminal 20 may be a livestreamer and the user terminal 30 may be a viewer. In some embodiments, the livestreamers and viewers may be referred to as the user. The Server 110 may include one or a plurality of information processing devices connected via network NW. The user terminal 20 and 30 may be, for example, a portable terminal such as the smartphone, tablet, laptop PC, recorder, mobile game console, wearable device or the like, or the stationary computer such as desktop PC. The server 110, user terminal 20 and user terminal 30 may be communicably connected by any type of wire or wireless network NW.

The live streaming system 1 is involved in the livestreamer LV, the viewer AU, and APP provider (not shown), who provides the server 110. The livestreamer LV may record his/her own contents such as songs, talks, performance, game streaming or the like by his/her own user terminal 20 and upload to the Server 110 and be the one who distributes contents in real time. In some embodiments, the livestreamer LV may interact with the viewer AU via the live streaming.

The APP provider may provide a platform for the contents to go on live streaming in the server 110. In some embodiments, the APP provider may be the media or manager to manage the real time communication between the livestreamer LV and viewer AU. The viewer AU may access the platform by the user terminal 30 to select and watch the contents he/she would like to watch. The viewer AU may perform operations to interact with the livestreamer, such as commenting or cheering the livestreamer, by the user terminal 30. The livestreamer, who provides the contents, may respond to the comment or cheer. The response of the livestreamer may be transmitted to the viewer AU by video and/or audio or the like. Therefore, a mutual communication among the livestreamer and viewer may be accomplished.

The "live streaming" in this specification may be referred to as the data transmission which enables the contents the livestreamer LV recorded by the user terminal 20 to be substantially reproduced and watched by the viewer AU via the user terminal 30, In some embodiments, the "live streaming" may also refer to the streaming which is accomplished by the above data transmission. The live streaming may be accomplished by the well-known live streaming technology such as HTTP Live Streaming, Common Media Application Format, Web Real-Time Communications, Real-Time Messaging Protocol, MPEG DASH or the like. The live streaming may further include the embodiment that the viewer AU may reproduce or watch the contents with specific delay while the livestreamer is recording the contents. Regarding the magnitude of the delay, it should be at least small enough to enable the livestreamer LV and the viewer AU to communicate. However, live streaming is different from so-called on-demand streaming. More specifically, the on-demand streaming may be referred to as storing all data, which records the contents, in the server 110 and then providing the data from the server 110 to the user at random timing according to the user's request.

The "streaming data" in this specification may be referred to as the data includes image data or voice data. More specifically, the image data (may be referred to as video data) may be generated by the image pickup feature of the user terminal 20 and 30. The voice data (may be referred to as audio data) may be generated by the audio input feature of the user terminal 20 and 30. The streaming data may be reproduced by the user terminal 20 and 30, so that the contents relating to users may be available for watching. In some embodiments, during the period from the streaming data being generated by the user terminal of the livestreamer to being reproduced by the user terminal of the viewer, the processing of changing format, size or specification of the data, such as compression, extension, encoding, decoding, transcoding or the like, is predictable. Before and after this kind of processing, the contents (such as video and audio) are substantially unchanged, so it is described in the current embodiments of the present disclosure that the streaming data before being processed is the same as that after being processed. In other words, if the streaming data is generated by the user terminal of the livestreamer and reproduced by the user terminal of the viewer via the server 110, the streaming data generated by the user terminal of the livestreamer, the streaming data passed through the Server 110 and the streaming data received and reproduced by the by the user terminal of the viewer are all the same streaming data.

As shown in FIG. 17, the livestreamer LV is providing the live streaming. The user terminal 20 of the livestreamer generates the streaming data by recording his/her video and/or audio, and transmits to the Server 110 via the network NW. At the same time, the user terminal 20 may display the video image VD on the display of the user terminal 20 to check the streaming contents of the livestreamer LV.

The livestreamer LV may be a real person or an AI model. The streaming data of the livestreamer LV may be generated or rendered in Server 110 or via a user terminal 20 or the like. The communication among the livestreamer LV and viewer AU1, AU2 may be realized via the network NW. In some embodiments, the AI model may be trained internally or provided by a third-party service such as Google PaLM, ChatGPT or other LLM (large language model) or the like.

The viewer AU1, AU2 of the user terminal 30*a*, 30*b*, who request the platform to provide the live streaming of the livestreamer, may receive streaming data corresponding to the live streaming via the network NW and reproduce the received streaming data to display the video image VD1, VD2 on the display and output the audio from a speaker or the like. The video image VD1, VD2 displayed on the user terminal 30*a*, 30*b* respectively may be substantially the same as the video image VD recorded by the user terminal of the livestreamer LV, and the audio outputted from the terminal 30*a*, 30*b* may also be substantially the same as the audio recorded by the user terminal of the livestreamer LV.

The recording at the user terminal 20 of the livestreamer may be simultaneous with the reproducing of the streaming data at the user terminal 30*a*, 30*b* of the viewer AU1, AU2. If a viewer AU1 inputs a comment on the contents of the livestreamer LV into the user terminal 30*a*, the Server 110 will display the comment on the user terminal 20 of the livestreamer in real time, and also display on the user terminal 30*a*, 30*b* of the viewer AU1, AU2 respectively. If the livestreamer LV responds to the comment, the response may be outputted as the text, image, video or audio from the terminal 30*a*, 30*b* of the viewer AU1, AU2, so that the communication of the livestreamer LV and viewer AU may be realized. Therefore, the live streaming system may realize the live streaming of two-way communication.

Figure 18:
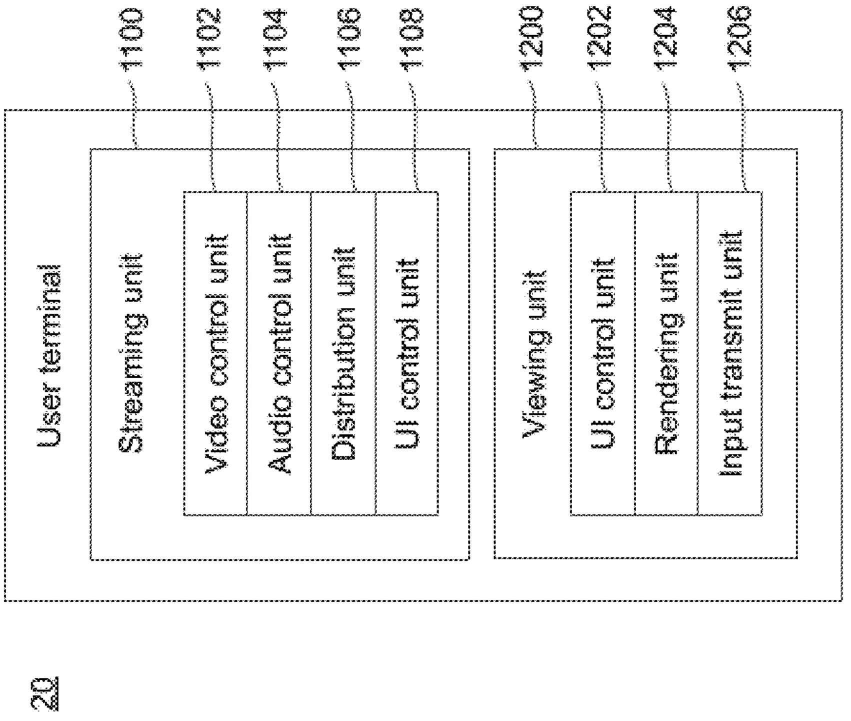
FIG. 18 is a schematic block diagram of the user terminal 20 according to some embodiments of subject application.

FIG. 18 is a block diagram showing a function and configuration of the user terminal 20 in FIG. 17 according to the embodiment of the present disclosure. The user terminal 30 has the similar function and configuration of the user terminal 20. The blocks depicted in the block diagram of this specification are implemented in hardware such as devices like a CPU of a computer or mechanical components, and in software such as a computer program depicts functional blocks implemented by the cooperation of these elements. Therefore, it will be understood by those skilled in the art that the functional blocks may be implemented in a variety of manners by a combination of hardware and software.

The livestreamer LV and viewer AU may download and install the live streaming application (live streaming APP) of the present disclosure to the user terminal 20 and 30 from the download site via network NW. Or the live streaming APP may be pre-installed in the user terminal 20 and 30. By the execution of the live streaming by the user terminal 20 and 30, the user terminals 20 and 30 may communicate with the Server 110 via the network NW to realize a plurality of functions. The functions realized by the execution of the live streaming APP by the user terminal 20 and 30 (More specifically, the processor such as CPU) is described below as the functions of the user terminal 20 and 30. These functions are basically the functions that the live streaming APP makes the user terminals 20 and 30 realize. In some embodiments, these functions may also be realized by transmitting from the Server 110 to the web browser of the user terminal 20 and 30 via network NW and be executed by the computer program of the web browser. The computer program may be written in the programming language such as HTML (Hyper Text Markup Language) or the like.

The user terminal 20 includes streaming unit 1100 and viewing unit 200. In some embodiments, the streaming unit 1100 is configured to record the audio and/or video data of the user and generate streaming data to transmit to the server 110. The viewing unit 1200 is configured to receive and reproduce streaming data from server 110. In some embodiments, a user may activate the streaming unit 1100 when broadcasting or activate the viewing unit 1200 when watching streaming respectively. In some embodiments, the user terminal who is activating the streaming unit 1100 may be referred to as a livestreamer or be referred to as the user terminal which generates the streaming data. The user terminal who is activating the viewing unit 1200 may be referred to as a viewer or be referred to as the user terminal which reproduces the streaming data.

The streaming unit 1100 may include video control unit 1102, audio control unit 1104, distribution unit 1106 and UI control unit 1108. The video control unit 1102 may be connected to a camera (not shown) and the video is controlled by the camera. The video control unit 1102 may obtain the video data from the camera. The audio control unit 1104 may be connected to a microphone (not shown) and the audio is controlled by the microphone. The audio control unit 1104 may obtain the audio data from the microphone.

The distribution unit 1106 receives streaming data, which includes video data from the video control unit 1102 and audio data from the audio control unit 1104, and transmits to the Server 110 via network NW. In some embodiments, the distribution unit 1106 transmits the streaming data in real-time. In other words, the generation of the streaming data from the video control unit 1102 and audio control unit 1104, and the distribution of the distribution unit 1106 is performed simultaneously.

UI control unit 1108 controls the UI for the livestreamer. The UI control unit 1108 is connected to a display (not shown) and is configured to generate the streaming data to whom the distribution unit 1106 transmits, reproduces and displays the streaming data on the display. The UI control unit 1108 shows the object for operating or the object for instruction-receiving on the display and is configured to receive the tap input from the livestreamer.

The viewing unit 1200 may include UI control unit 1202, rendering unit 1204 and input transmit unit 1206. The viewing unit 1200 is configured to receive streaming data from Server 110 via network NW. The UI control unit 1202 controls the UI for the viewer. The UI control unit 1202 is connected to a display (not shown) and/or speaker (not shown) and is configured to display the video on the display and output the audio from the speaker by reproducing the streaming data. In some embodiments, Outputting the video on the display and audio from the speaker may be referred to as "reproducing the streaming data". The UI control unit 1202 may be connected to an input unit such as touch panel, keyboard or display or the like to obtain input from the users.

The rendering unit 1204 may be configured to render the streaming data from the Server 110 and the frame image. The frame image may include user interface objects for receiving input from the user, the comments inputted by the viewers and the data received from the server 110. The input transmit unit 1206 is configured to receive the user input from the UI control unit 1202 and transmit to the Server 110 via the network NW.

In some embodiments, the user input may be clicking an object on the screen of the user terminal such as selecting a live stream, entering a comment, sending a gift, following or unfollowing a user, voting in an event, gaming or the like. For example, the input transmit unit 1206 may generate gift information and transmit to Server 110 via the internet NW if the user terminal of the viewer clicks a gift object on the screen in order to send a gift to the livestreamer.

Figure 19:
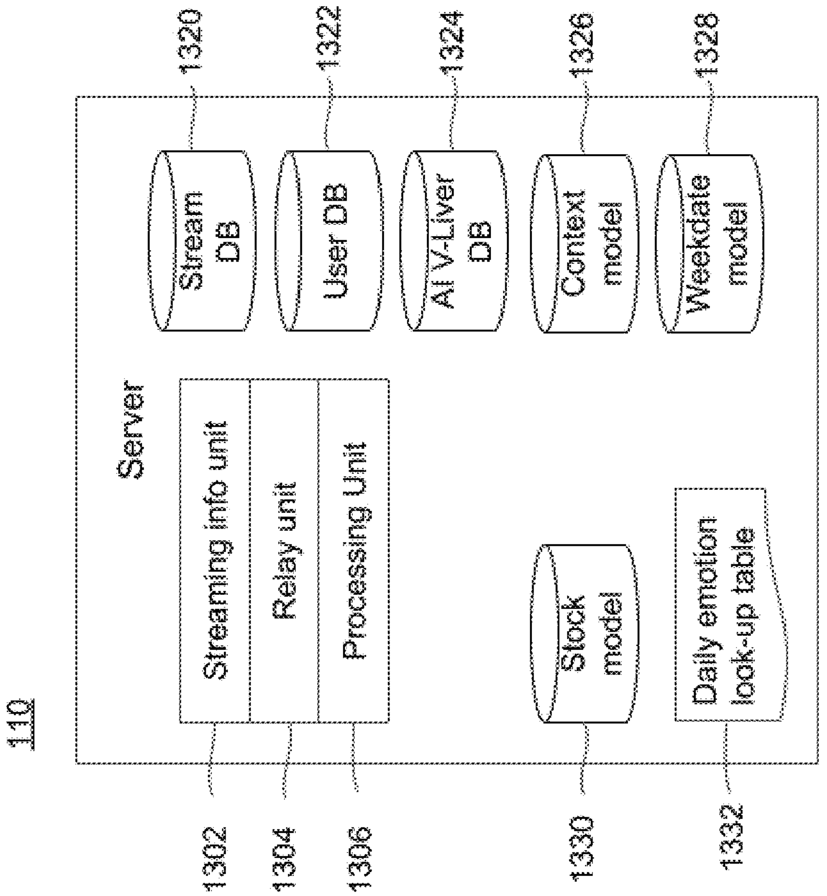
FIG. 19 is a schematic block diagram of the Server 110 according to some embodiments of subject application.

FIG. 19 is a schematic block diagram of the Server 110 according to some embodiments of the subject application. The Server 110 may include streaming info unit 1302, relay unit 1304, processing unit 1306, stream DB 1320, user DB 1322, AI V-Liver DB 1324, context model 1326, weekdate model 1328, stock model 1330 and daily emotion look-up table 1332.

The streaming info unit 1302 receives the request of live streaming from the user terminal 20 of the livestreamer via the network NW. Once receiving the request, the streaming info unit 1302 registers the information of the live streaming on the stream DB 1320. In some embodiments, the information of the live streaming may be the stream ID of the live streaming and/or the livestreamer ID of the livestreamer corresponding to the live streaming.

Once receiving the request of providing the information of the live streaming from the viewing unit 1200 of the user terminal 30 from the viewer via the network NW, the streaming info unit 1302 refers to the stream DB 1320 and generates a list of the available live streaming.

The streaming info unit 1302 then transmits the list to the user terminal 30 via the network NW. The UI control unit 1202 of the user terminal 30 generates a live streaming selection screen according to the list and displays the list on the display of the user terminal 30.

Once the input transmit unit 1206 of the user terminal 30 receives the selection of the live streaming from the viewer on the live streaming selection screen, it generates the streaming request including the stream ID of the selected live streaming and transmits to the Server 110 via the network. The streaming info unit 1302 may start to provide the live streaming, which is specified by the stream ID in the streaming request, to the user terminal 30. The streaming info unit 1302 may update the stream DB 1320 to add the viewer's viewer ID of the user terminal 30 to the livestreamer ID of the stream ID.

The relay unit 1304 may relay the transmission of the live streaming from the user terminal 20 of the livestreamer to the user terminal 30 of the viewer in the live streaming started by the streaming info unit 1302. The relay unit 1304 may receive the signal, which indicates the user input from the viewer, from the input transmit unit 1206 while the streaming data is reproducing. The signal indicating the user input may be the object-designated signal which indicates the designation of the object shown on the display of the user terminal 30. The object-designated signal may include the viewer ID of the viewer, the livestreamer ID of the livestreamer, who delivers the live streaming the viewer is viewing, and object ID specified by the object. If the object is a gift or the like, the object ID may be the gift I D or the like. Similarly, the relay unit 1304 may receive the signal indicating the user input of the livestreamer, for example the object-designated signal, from the streaming unit 1100 of the user terminal 20 while the streaming data is reproducing.

The processing unit 1306 may be configured to generate emotion to the AI V-Liver. More specifically, the processing unit 1306 may determine an emotion prompt and feed the emotion prompt into a machine learning model to generate the AI V-Liver with emotion. In some embodiments, the processing unit 1306 may calculate an emotion score to determine the emotion prompt. The emotion score may be determined according to the context score, week score, stock score or the like. The context score, week score or stock score may be calculated according to the context event, week event or stock event.

Here, the "context event" may refer to the event the AI V-Liver encounters. The context event may be an event updated periodically such as every day or the like. The context event may be a list of events as shown in FIG. 23. One or more events from the event list may be selected randomly to be the context event and context score. For example, if the context ID CT01 is selected, then the context event prompt may be "You will have a big dinner with friends and you are looking forward" and the context score may be 2.

In some embodiments, the context event may also be determined dynamically such as from the top news or popular news on that day. For example, if our baseball team wins the world championship today, the context event prompt may be "your favorite baseball team wins the world championship and you are very excited" and the context score may be 3 or the like. In some embodiments, the context event may also be the event the AI V-Liver encounters in the live streaming room, for example, the conversation with the viewers. For example, the viewers may talk about cockroaches with the AI V-Liver and a context event and context score with negative emotion may be generated. In some embodiments, the generation and selection of the context event may be realized flexibly.

Here, the "week event" may refer to the emotion of the AI V-Liver on the day of the week. There are seven days in a week from Monday to Sunday, and the AI V-Liver may have different week events and week scores on each day of the week. For example, people always feel blue on Monday, and people always feel excited on Friday and Saturday. In some embodiments, the relationship between the week event and the week score may be determined, for example, as shown in FIG. 24 or the like.

In some embodiments, a week event corresponding to each day of the week may also be generated and fed into the AI V-Liver. For example, if today is Monday, the week event of "Today is blue Monday, if you feel a little depressed, you can talk to the audience about how you spent your week" and the week score of "−2.9" may be generated. In some embodiments, the relationship between the week event and the week score may be determined flexibly according to the practical need.

Here, the "stock event" may refer to the emotion of the AI V-Liver according to the stock price. Stock market is a popular investment tool for the public, and the emotion of AI V-Liver may change according to the stock price. For example, if the stock price skyrockets rapidly, people always feel happy and excited. In some embodiments, the relationship between the stock event and the stock score may be determined, for example as shown in FIG. 25 or the like.

In some embodiments, a stock event may also be generated and fed into the AI V-Liver. For example, if the stock price fell a lot, the stock event of "the stocks you invested in fell a lot yesterday, so you are in a bad mood, please give you more gift" and the stock score of "−1" may be generated. In some embodiments, the relationship between the stock event and the stock score may be determined flexibly according to the practical need.

In some embodiments, the total score of an emotion score may be calculated according to the context score, week score or stock score. In some embodiments, the total score of an emotion score may be at least one of the above parameters or other possible parameters. In some embodiments, each parameter may have a weighted value to adjust the importance of individual parameters. For example the total score of an emotion score may be like the following:

$$\text{Emotion Score} = \text{Context Score} + \text{Week Score} + \text{Stock Score} \tag{1}$$

Upon the total score being determined, the processing unit 1306 may further determine the emotion prompt according to the total score of the emotion score. In some embodiments, the processing unit 1306 may determine the emotion prompt according to the daily emotion look-up table 1332 shown in FIG. 26. In some embodiments, the processing unit 1306 may also generate an emotion prompt via machine learning technology or the like according to the total score. For example, the processing unit 1306 may generate a positive or negative emotion prompt by an LLM model if the total score of emotion score is high or low.

Once the emotion prompt is determined, the processing unit 1306 may further feed the emotion prompt to the AI V-Liver. In some embodiments, the emotion prompt may be the sentence shown in FIG. 26, and may further include the prompt of the sentence in the context event, week event, stock event or the like. The AI V-Liver may generate a response on comments from the viewers according to the emotion prompt. In some embodiments, the emotion prompt may be generated periodically or the like. For example, the AI V-Liver may be fed with the emotion prompt every day, each week, each hour or the like. According to the embodiments, the AI V-Liver may have different emotions at different times.

FIG. 20 shows an exemplary data structure of the stream DB 1320 of FIG. 19. The stream DB 1320 holds information regarding a live stream currently taking place. The stream DB 1320 stores a stream ID for identifying a live-stream on a live distribution platform provided by the live streaming system 1, a livestreamer ID for identifying the livestreamer who provides the live-stream, and a viewer ID for identifying a viewer of the live-stream, in association with each other.

FIG. 21 shows an exemplary data structure of the user DB 1322 of FIG. 19. The user DB 1322 holds information regarding users. The user DB 1322 stores a user ID for identifying a user, points for identifying the points the user accumulates, level for identifying the level of the user and status for identifying the status of the user in association with each other. The point is the electronic value circulated within the live-streaming platform. The level may be an indicator of the amount of user activity or engagement on the live streaming platform. The status may be an identity or membership status of the user on the live streaming platform.

FIG. 22 shows an exemplary data structure of the AI V-Liver DB 1324 of FIG. 19. The AI V-Liver DB 1324 holds information regarding an AI V-Liver live streaming currently taking place. The AI V-Liver DB 1324 stores an AI V-Liver ID for identifying an AI V-Liver, a topic for identifying topic of the AI V-Liver, a name for identifying the name of the AI V-Liver, a motion ID for identifying the motion of the AI V-Liver, a motion description for identifying description of the motion, a URL for identifying location of the AI V-Liver model, in association with each other.

In some embodiments, the topic of the AI V-Liver may be the conversations the AI V-Liver mainly focuses on. For example, the topic may be astrology if the setting of the AI V-Liver is an astrologer, and the topic may be politics if the setting of the AI V-Liver is a politician. In some embodiments, the name of the AI V-Liver may be displayed in the live streaming room such as the object 602 in FIG. 28. The motion ID and motion description may be corresponding to a facial expression, body movement or the combination of the AI V-Liver such as smiling, dancing, running or the like. The URL may indicate location of the AI V-Liver model and the AI V-Liver model may include the file of the AI V-Liver such as the Live2D model, VRM model or the like.

In some embodiments, live streams from the AI V-Liver may also be stored in the stream DB 1320 or a separate DB. In some embodiments, information of the AI V-Liver may also be stored as a user in the user DB 1322 or a separate DB. In some embodiments, the details of each database may be determined flexibly according to the practical need.

FIG. 23 shows an exemplary data structure of the context model 1326 of FIG. 19. The context model 1326 holds information regarding a list of context events and its corresponding context score. The context model 1326 stores a context ID for identifying a context event, an context event prompt for identifying description or sentence of the event and a context score for identifying the context score corresponding to the context event, in association with each other.

In some embodiments, the processing unit 1306 may determine a context event as the event the AI V-Liver encounters from the context model 1326. In some embodiments, the processing unit 1306 may determine the event randomly or according to predetermined rules. For example, if the context ID CT02 is randomly selected, the context event prompt of "You encountered a traffic jam and felt annoyed" may be fed into the AI V-Liver and the context score of "−1" may be taken as a context score to be contributed to the emotion score.

FIG. 24 shows an exemplary data structure of the weekdate model 1328 of FIG. 19. The weekdate model 1328 holds information regarding a day in a week and its corresponding week score, in association with each other. The relationship between a day in a week and its corresponding week score may be determined flexibly according to the practical need. For example, people always feel blue on Monday, and people always feel excited on Friday and Saturday, so the week scores on Monday may be relatively low and the week scores on Friday and Saturday may be relatively high.

In some embodiments, a curve or formula may be generated to calculate the relationship of a day in a week and its corresponding week score. In some embodiments, the day in a week and its corresponding week score may be determined first, and a curve or formula may be used to approximate the relationship between the day and its corresponding week score. For example, a cubic polynomial of "y=−2.9+1.38x+0.464x^+−0.111x^3" is generated to calculate the relationship as shown in FIG. 24.

Here, x is the day in a week and y is the week score. The day in a week may be Monday, Tuesday, Wednesday, Thursday, Friday, Saturday and Sunday, and its corresponding x value may be 0, 1, 2, 3 4, 5 and 6. In some embodiments, the week score is the score corresponding to a day in the week. In some embodiments, the week score may also be further divided into the daytime or nighttime of a day in a week, each hour or each minute of a day in a week or the like. In some embodiments, the period of time may be determined flexibly.

In some embodiments, each weekdate may correspond to a week score and also a week event prompt or the like. For example, if the weekdate is Monday, then the week score may be −2.9 and a week event prompt of "Today is blue Monday, if you feel a little depressed, you can talk to the audience about how you spent your week" may be generated. In some embodiments, the week event prompt may be generated according to a predetermined look-up table, machine learning model or the like.

FIG. 25 shows an exemplary data structure of the stock model 1330 of FIG. 19. The stock model 1330 holds information regarding percentage change in stock price and its corresponding stock score, in association with each other. The relationship between percentage change in stock price and its corresponding stock score may be determined flexibly according to the practical need. For example, if the stock price increases or decreases by 3%, the stock score would be 3, −3 or the like.

In some embodiments, a curve or formula may also be generated to calculate the relationship of percentage change in stock price and its corresponding stock score. In some embodiments, the range of percentage change in stock price and its corresponding stock score may be determined first, and a curve or formula may be used to approximate the relationship between the percentage change and its corresponding stock score. For example, the sigmoid curve or arctan function ranging from 3 to −3 is generated to calculate the relationship as shown in FIG. 25.

In some embodiments, the x value may be the percentage change in stock price and the y value may be the corresponding stock score. In some embodiments, the stock price may be an individual stock or the overall stock market. In some embodiments, the stock score may change in real-time according to the stock price. In some embodiments, the stock score may also be based on the current stock price, yesterday's closing price, today's opening price or the like. In some embodiments, the calculation of stock score may be determined flexibly.

In some embodiments, each percentage change in stock price may correspond to a stock score and also a stock event prompt or the like. For example, if the percentage change in stock price is −2, then the stock score may be −2.8 and a stock event prompt of "the stocks you invested in fell a lot yesterday, so you are in a bad mood, please give you more gift" may be generated. In some embodiments, the stock event prompt may be generated according to a predetermined look-up table, machine learning model or the like.

In some embodiments, the stock event prompt may be generated according to the percentage change in stock prices, or it may also be triggered at specific percentage changes in stock prices. In some embodiments, no sentence of the stock event prompt would be generated if the percentage change in stock price satisfies a specific ranger RA as shown in FIG. 25. For example, the stock event prompt may not be generated during a ranger RA of the percentage change in stock prices from −1% to 1% as shown in FIG. 25.

According to the embodiments, "the stock event prompt would be generated and fed into the AI V-Liver when the percentage change in stock prices is greater than or less than 1%. In other words, the percentage change in stock prices within the range of ±% would affect the stock score only, and the stock event prompt would not be generated. Therefore, it may avoid giving the impression of encouraging stock speculation. Moreover, the AI V-Liver may act like a real-person and the user experience may be improved.

FIG. 26 shows an exemplary data structure of daily emotion look-up table 1332 of FIG. 19. The daily emotion look-up table 1332 may be configured to store the relationship between the total score and the emotion prompt. As shown in FIG. 26 as an example, the daily emotion look-up table 1332 may include total score and its corresponding emotion prompt, in association with each other.

In some embodiments, a range or a value of total score may correspond to an emotion prompt. For example, the range of total score ">3", "3~1" and "1~−1", "−1~−3" and "<−3" may correspond to different emotion prompts as shown in FIG. 26. In some embodiments, the total score may be determined according to the sum of at least one parameter from the context score, week score, stock score or the like. For example, if the total score is larger than 3, the emotion prompt of "You are in a very good mood today. You have to interact with the audience in a positive way." may be fed into the AI V-Liver as its daily emotion.

Figure 27:
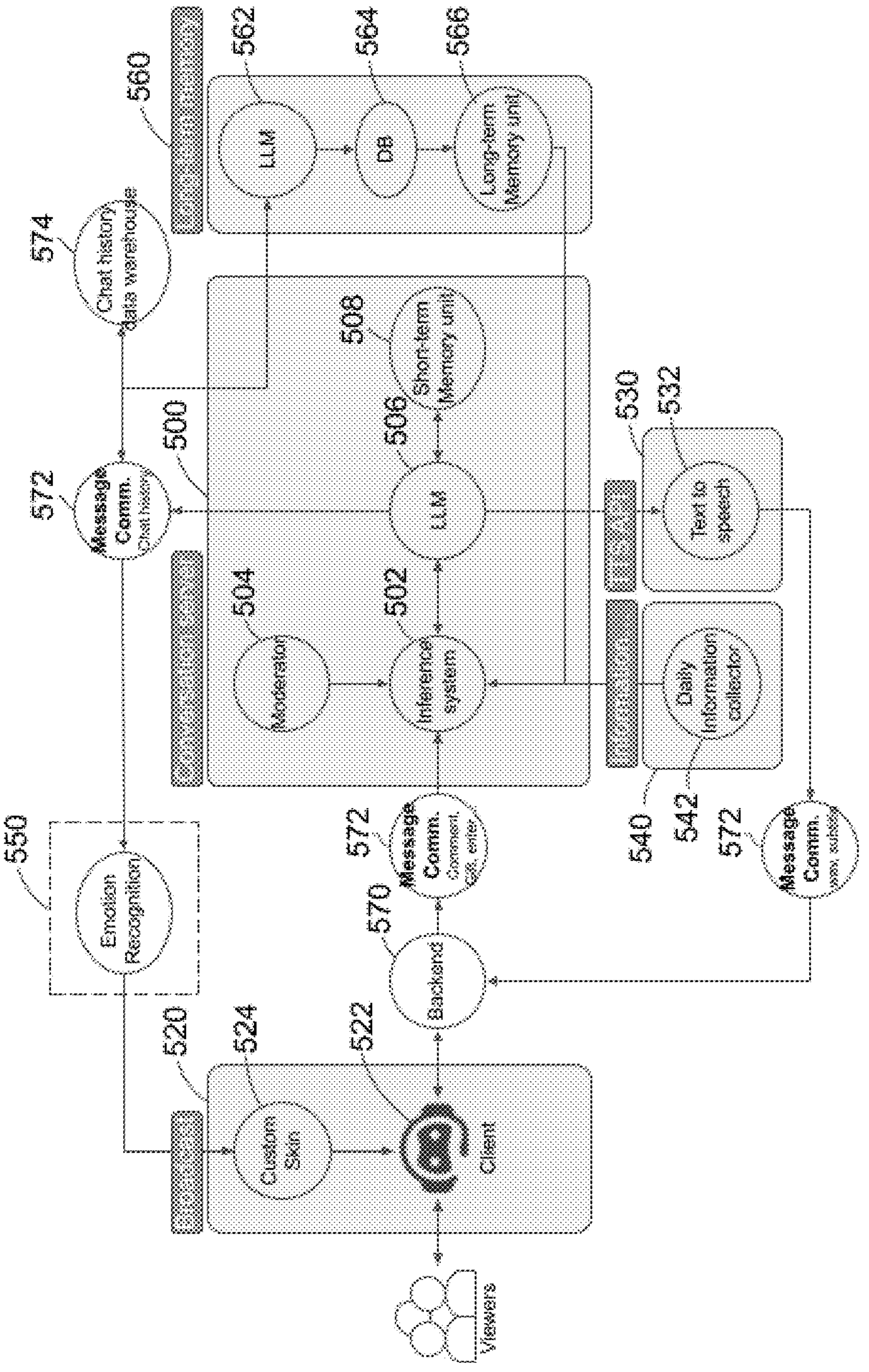
FIG. 27 is exemplary functional configuration of the live streaming system 1 according to some embodiments of subject application.

FIG. 27 is exemplary functional configuration of the live streaming system 1 according to some embodiments of subject application. The configuration of AI V-Liver in Server 10, 110 and 210 may include the conversation server portion 500, broadcast portion 520. TTS portion 530, information portion 540, emotion recognition portion 550 and long-term memory portion 560.

The conversation server portion 500 is configured to generate conversation between the AI V-Liver and the viewers. The broadcast portion 520 is configured to display broadcasting of the AI V-Liver to the viewers. The TTS portion 530 is configured to convert text to speech for the AI V-Liver to behave like speaking. The information portion 540 is configured to collect information for the AI V-Liver to have interactions with the viewers. The emotion recognition portion 550 is configured to recognize the emotion of the AI V-Liver and trigger corresponding motions. The long-term memory portion 560 is configured to extract keywords from the conversation between the AI V-Liver and viewers and store in the long-term memory DB 1328 for further processing.

In some embodiments, the conversation server portion 500 may include an inference system 502. The inference system 502 is configured to infer a response to the comment from the viewers according to a plurality of parameters such as the interaction from the viewers. In some embodiments, the response may be triggered, for example, when a viewer enters the live streaming room, when the viewer has interaction with the AI V-Liver or the like. The interaction from the viewers may include comments, gifts, snacks from the viewers or the like. In some embodiments, the inference system 502 may infer a mood or emotion to be set in the AI V-Liver according to input from the information portion 540.

In some embodiments, the inference system 502 may also receive input from the moderator 504 to generate response or the like. Here, the "moderator" may refer to an administrator in the live streaming room responsible for managing the live streaming and overall interaction within the streaming. The moderator 504 may be a real person or also an AI V-Liver. The moderator 504 may be used to ensure orderly viewer interaction, address inappropriate behavior, provide event guidelines or the like.

In some embodiments, the information collected by the inference system 502 may also be fed into a machine learning model such as the LLM 506 for generating response to the viewers. In some embodiments, the processing unit 1306 may store information from the LLM 506 in the short-term memory unit 508. For example, the short-term memory unit 508 may be configured to store the latest ten conversations between the AI V-Liver and viewers.

The output, such as the response, may be transmitted to the broadcast portion 520 for the AI V-Liver to interact with the viewers. In some embodiments, the response may also be transmitted to the broadcast portion 520 via the emotion recognition portion 550. The emotion recognition portion 550 may recognize emotion of the response and determine one or more corresponding motions on the AI V-Liver.

In some embodiments, the response may also be transmitted to the broadcast portion 520 via the TTS portion 530. The TTS portion 530 may convert the response from text to speech. In some embodiments, the response in the format of text data and audio data may be transmitted to broadcast portion 520. The text data may be generated as a comment in the message zone 606 or subtitle in the subtitle zone 613 of the live streaming room and the audio data may be played in accordance with the motion of the AI V-Liver. Therefore, the AI V-Liver may act like a real-person and the user experience may be improved.

In some embodiments, the broadcast portion 520 may include a client 522 and a custom skin 524. The client 522 may be an entity of AI V-Liver displayed in the live streaming room. In some embodiments, streaming data of the AI V-Liver may be rendered in the client 522, so the viewers may pull the streaming data to reproduce and watch the live streaming in the user terminal 30. The custom skin 524 may include a virtual skin or virtual avatar of the AI V-Liver. The virtual skin may be a 2D or 3D character model built in Server 10, 110 and 210 or provided by a third-party service such as Live2D model, VRM model or the like.

The custom skin 524 may also include motion files of the AI V-Liver. The motion files may be image, video or animation, and the motion may be facial features, body movement or the like such as smiling, jumping, waving, dancing or the like. Each motion may be corresponding to one or more emotions and a plurality of motions may also be combined to display one or more emotions. For example, the AI V-Liver may smile and wave when a viewer enters the live streaming room.

In some embodiments, the TTS portion 530 may include a text to speech unit 532. The text to speech unit 532 is configured to convert text input into audio output. In some embodiments, the audio output may be a .wav file or the like. In some embodiments, machine learning technology may also be applied to generate the voice of the AI V-Liver. In some embodiments, the voice may be from a user in the live streaming platform such as a livestreamer. The voice may also be trained with specific genres like a cutie girl or macho man. In some embodiments, the TTS portion 530 may also include a speech to text unit to convert audio input into text output.

In some embodiments, the information portion 540 may include a daily information collector 542. The daily information collector 542 is configured to collect information for the AI V-Liver to generate daily emotion or the like. The information may be, for example, the current date, weekdate, current time, day or night, weather situation, stock price, top news, topics the viewers are interested in or the like. In some embodiments, an information storage (not shown) may also be connected to the information portion 540 to store the information. The information from the information portion 540 may be transmitted to the inference system 502 to generate daily emotion, response or the like.

In some embodiments, the output from the LLM 506 may further be transmitted to the long-term memory portion 560. The long-term memory portion 560 may include a machine learning model such as the LLM 562. The comments from viewers and response from the AI may form a conversation, and the conversation may be fed into the LLM 562. The LLM 562 may extract keywords associated with the user from the conversation.

In some embodiments, the keyword may be related to a topic of the AI V-Liver. For example, if the AI V-Liver is an Astrologer, then "astrology" may be one topic of the AI V-Liver. The viewer may ask the AI V-Liver about "how is my fortune today". The AI V-Liver may generate a response of "what is your star sign" to ask the star sign of the viewer in order to do the fortune telling. The viewer may further respond to the AI V-Liver that "I am a Taurus" or the like. The LLM 562 may analyze the conversation between the AI V-Liver and the viewer and associate the keyword "Taurus" with the viewer.

The long-term memory portion 560 may further include a long-term memory DB such as the DB 564 for storing the association of the keyword and the viewer. In some embodiments, DB 564 may be a database such as Redis or the like. Redis is an open-source, in-memory database management system categorized as a NoSQL (Not Only SQL) database. In some embodiments, other suitable databases may also be used to store the information as long-term memory. In some embodiments, the conversation with keywords may be converted into a certain data format such as json format and then stored in the DB 564.

The long-term memory portion 560 may further include a long-term memory unit 566. The long-term memory unit 566 may retrieve information from the DB 564 and transmit the information to the inference system 502. For example, the long-term memory unit 566 may retrieve information of {"username": "Chris", "star sign": "Taurus"} from the DB 564 and transmit the information into the inference system 502. Therefore, the inference system 502 may infer a response to the comment according to the information in the DB 564.

For example, the viewer Chris told the AI V-Liver that his star sign is "Taurus" yesterday. The next day when the viewer Chris enters the live streaming room and asks about "how is my fortune today". The AI V-Liver may respond according to the information of {"username": "Chris", "star sign": "Taurus" }, and then respond with "Hello, Chris. The fortune of Taurus today is pretty good". In other words, the AI V-Liver may remember certain information related to the viewers. Therefore, it may facilitate the conversation between the AI V-Liver and the viewers, and the user experience may be improved.

In some embodiments, the communication between the conversation server portion 500 and the broadcast portion 520 may be realized via a backend 570. In some embodiments, the communication between each portion may be realized via message communication service 572 such as Pub/Sub or the like. Here, the Pub/Sub stands for "Publish/Subscribe" and is a messaging communication pattern. The message such as comments, gift, chat history, audio data, subtitle may also be communicated in real-time among different portions via the Pub/Sub pattern or the like. In some embodiments, other suitable messaging communication patterns may also be applied flexibly.

In some embodiments, the status in the live streaming room may also be fed into the conversation server portion 500 via the backend 570 and message communication service 572 or the like. The "status" in the live streaming room may refer to, for example, the receiving points of the AI V-Liver, the time length of broadcasting, the number of followers or subscribers or the like. The response from the AI V-Liver may further be generated according to the "status" in the live streaming room. For example, if the AI V-Liver is participating in an event and the receiving point is low, a response of"give me gift to win the event" or the like may be generated.

In some embodiments, a chat history data warehouse 574 may also be provided to store the chat history of the conversation between the AI V-Liver and the viewers in the live streaming room. In some embodiments, the chat history data warehouse 574 may be a data management and analysis warehouse internally or provided by a third-party such as BigQuery or the like. In some embodiments, the chat history in the chat history data warehouse 574 may also be further used flexibly.

According to the embodiments, the AI V-Liver may be trained by the information portion 540, and also the conversation server portion 500 and long-term memory portion 560. Therefore, an unique AI V-Liver with different emotion prompts may be obtained. According to the embodiments, the interaction between the AI V-Liver and the viewers may vary according to the emotion of the AI V-Liver. Even if the interactions from the viewer are similar, the AI V-Liver may generate different responses based on different emotions. Therefore, the fun in the live streaming room may increase and the user experience may be improved.

Figure 28:
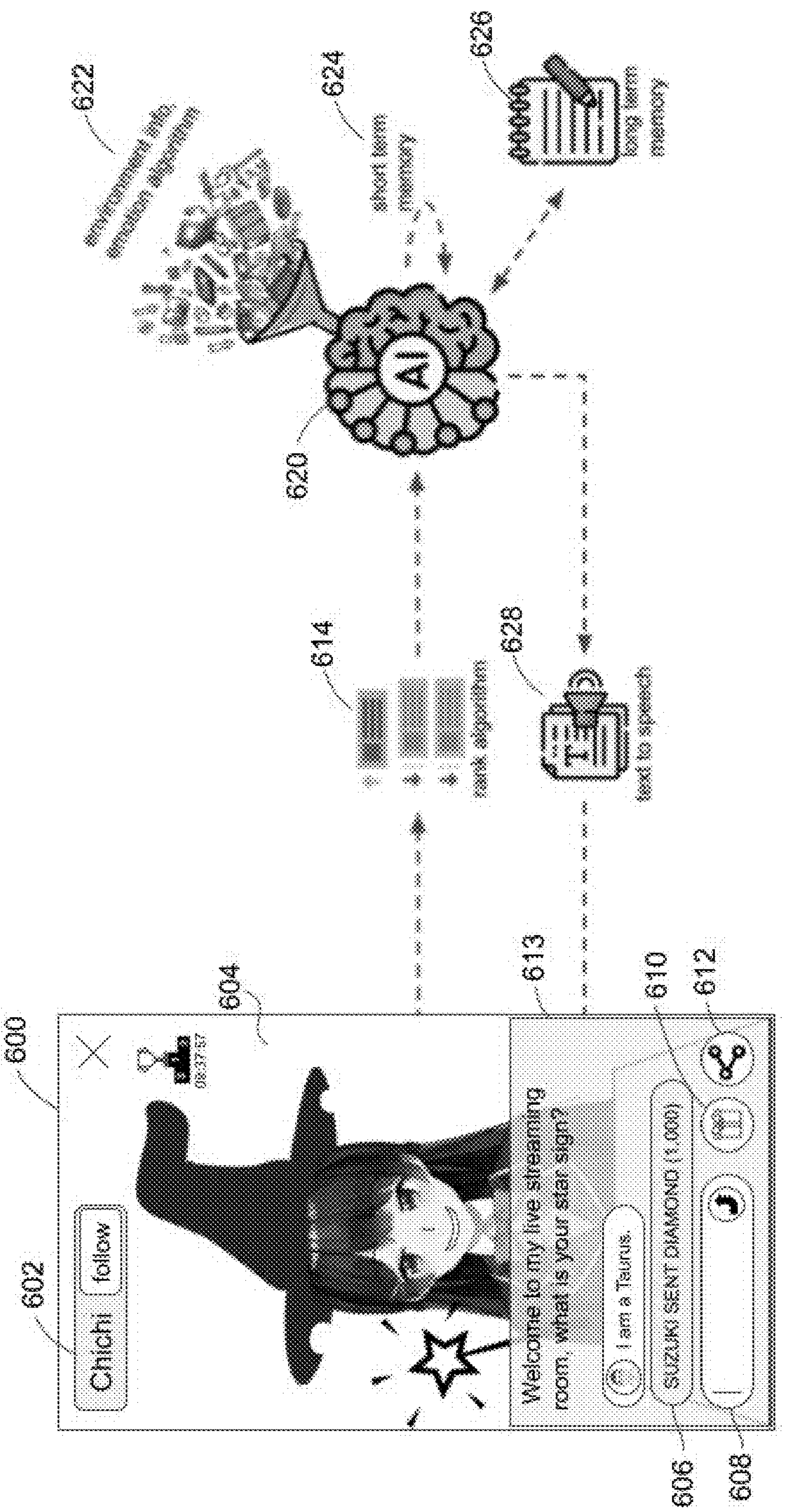
FIG. 28 is a simplified functional configuration with an exemplary screen image of a live-streaming room screen 600 in the live streaming system 1 according to some embodiments of subject application.

FIG. 28 is a simplified functional configuration with an exemplary screen image of a live-streaming room screen 600 in the live streaming system 1 according to some embodiments of subject application. As shown in the live-streaming room screen 600 in FIG. 28, once the viewer selects and enters the live-streaming room, the live-streaming room screen 600 of the AI V-Liver may be shown on the display. The live-streaming room screen 600 may include an AI V-Liver info object 602, AI V-Liver image 604, message zone 606, message input box 608, gift object 610, sharing object 612 or the like.

In some embodiments, the AI V-Liver may initiate a greeting with the viewer once the viewer enters the live streaming room. For example, the AI V-Liver may say "Welcome to my live streaming room, what is your star sign?" when the viewer enters the live streaming room. In some embodiments, the AI V-Liver may respond to the viewer when the viewer enters a comment or the like. For example, if the viewer says that "I am a Taurus", the AI V-Liver may generate a response related to the fortune of Taurus or the like.

In some embodiments, the AI V-Liver may also voluntarily generate a conversation or topic in response to no interaction in the live streaming room in a specific period of time. For example, if there is no interaction in the live streaming room for over five minutes, conversations such as "let me tell a joke" or "let me tell you the fortune of Taurus today" may be generated from the AI V-Liver voluntarily. According to the embodiments, the popularity of the live streaming room may be enhanced and the user experience may also be improved.

In some embodiments, the conversation 614, which includes comments from the viewers and/or the response from the AI V-Liver, may be transmitted to the AI brain 620. The AI brain 620 may be referred to as the brain of the AI V-Liver and is configured to generate an emotion, infer a response or the like. In some embodiments, the AI brain 620 may refer to the conversation server portion 500 in FIG. 27.

The AI brain 620 may receive information 622 such as the environment information, emotion algorithm or the like as an input. In some embodiments, the conversation may also be stored in short-term memory 624. In some embodiments, specific information may also be stored in long-term memory 626. The AI brain 620 may generate responses to the comment from the viewers and transmit the responses to the TTS 628. The TTS 628 may further convert the response from text data to audio data to be displayed in the live streaming room.

Figure 29:
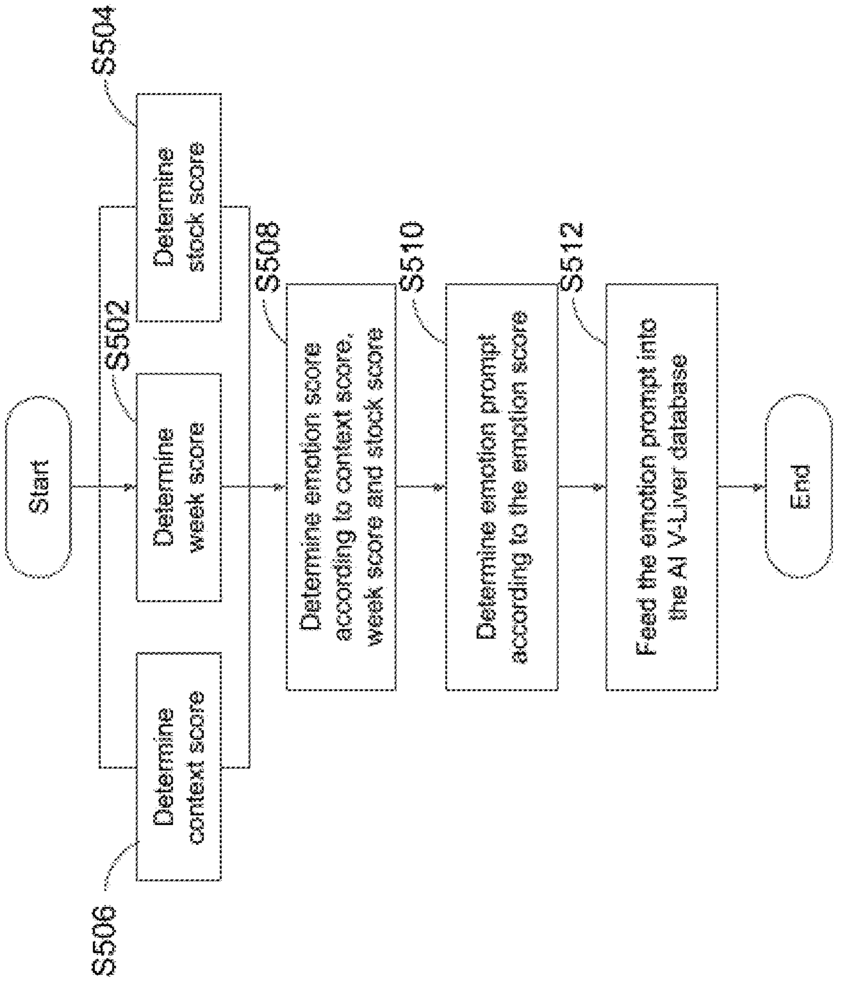
FIG. 29 is a flowchart showing steps of an application activation process on the live streaming system 1 according to some embodiments of subject application.

The operation of live streaming system 1 with the above configuration will be now described. FIG. 29 is a flowchart showing steps of an application activation process on the live streaming system 1 according to some embodiments of subject application. Once a user enters a live streaming room, the user may perform an operation by the user terminal to interact with the AI V-Liver. In some embodiments, the operation may include sending messages, sending gifts, following, unfollowing, voting, gaming or the like.

As shown in FIG. 29, the processing unit 1306 may determine scores of each parameter such as the context score, week score, stock score or the like (S502, S504 and S506). In some embodiments, the processing unit 1306 may determine the scores in parallel or simultaneously. In some embodiments, the processing unit 1306 may determine at least one of the above scores. In some embodiments, the processing unit 1306 may also determine the weight of each score or the like.

The processing unit 1306 may further determine the emotion score according to the context score, week score, stock score or the like (S508). In some embodiments, the processing unit 1306 may calculate the sum of the context score, week score and stock score to determine a total score of the emotion score. In some embodiments, the processing unit 1306 may determine the weight of each parameter and calculate the weighted sum to derive the total score. In some embodiments, the selection of parameters, weight or the like may be determined flexibly according to the practical need.

The processing unit 1306 may further determine the emotion prompt according to the emotion score or the like (S510). In some embodiments, the emotion prompt may be retrieved from a look-up table or the like according to the emotion score. In some embodiments, the emotion prompt may also be generated based on the emotion score and by the machine learning technology or the like. For example, if the emotion score is high, an emotion prompt with positive emotion may be generated from a machine learning model.

The processing unit 1306 may further feed the emotion prompt into the AI V-Liver database to generate an emotion for the AI V-Liver (S512). For example, the emotion prompt may be a sentence or paragraph with the instructions of a certain emotion, and to be fed into the inference system 502 or AI brain 620 to generate an AI V-Liver with certain emotion, personality, accent or the like.

The storage unit 919 is a device for data storage that is an example of a storage unit of the information processing device 900. The storage unit 919 includes, for example, a magnetic storage device such as a hard disk drive (HDD), a semiconductor storage device, an optical storage device, or a magneto-optical storage device. The storage unit 919 stores therein the programs and various data executed by the CPU 901, and various data acquired from an outside.

In some embodiments, the emotion may be reflected on the response generated by the conversation server portion 500. For example, if the emotion of the AI V-Liver is negative, the response may be "I don't want to do fortune-telling for you today" when viewers asked for fortune-telling. In some embodiments, the emotion may be determined and fed into the AI V-Liver everyday according to the weekdate. The emotion may also be determined, for example, each daytime or nighttime, each hour, each minute or the like.

Figures 30, 31:
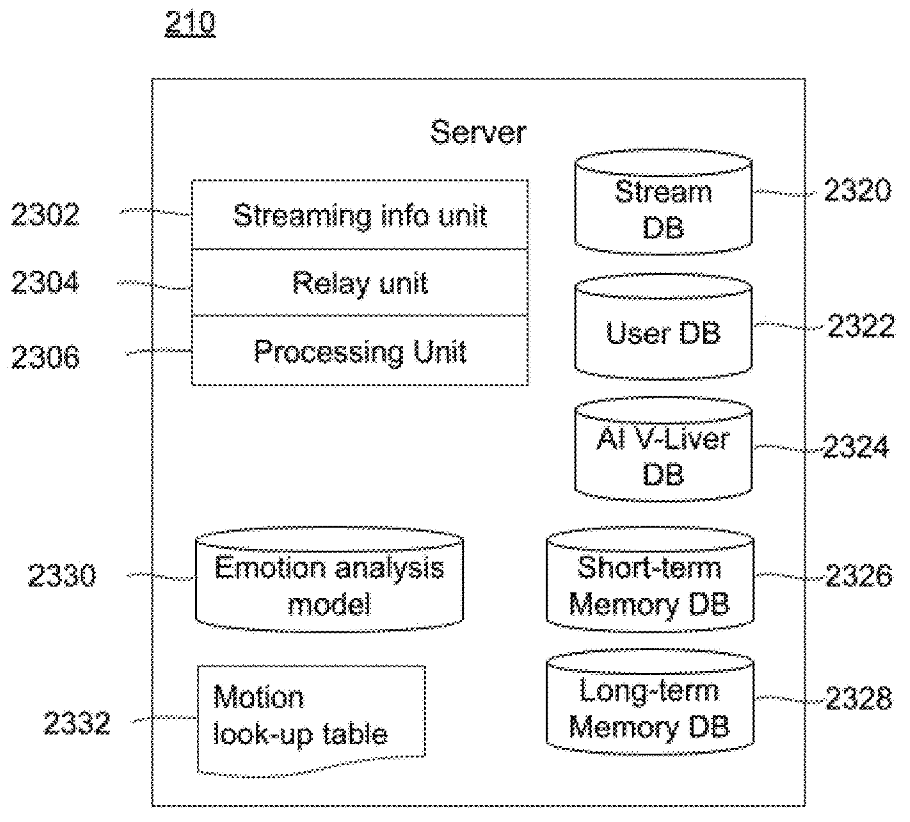
FIG. 30 is a schematic block diagram of the Server 210 according to some embodiments of subject application.
FIG. 31 shows an exemplary data structure of the stream DB 2320 of FIG. 30.

FIG. 30 is a schematic block diagram of the Server 210 according to some embodiments of the subject application. The Server 210 may include streaming info unit 2302, relay unit 2304, processing unit 2306, stream DB 2320, user DB 2322, AI V-Liver DB 2324, short-term memory DB 2326, long-term memory DB 2328, emotion analysis model 2330 and motion look-up table 2332.

The streaming info unit 2302 receives the request of live streaming from the user terminal 20 of the livestreamer via the network NW. Once receiving the request, the streaming info unit 2302 registers the information of the live streaming on the stream DB 2320. In some embodiments, the information of the live streaming may be the stream ID of the live streaming and/or the livestreamer ID of the livestreamer corresponding to the live streaming.

Once receiving the request of providing the information of the live streaming from the viewing unit 1200 of the user terminal 30 from the viewer via the network NW, the streaming info unit 2302 refers to the stream DB 2320 and generates a list of the available live streaming.

The streaming info unit 2302 then transmits the list to the user terminal 30 via the network NW. The UI control unit 1202 of the user terminal 30 generates a live streaming selection screen according to the list and displays the list on the display of the user terminal 30.

Once the input transmit unit 1206 of the user terminal 30 receives the selection of the live streaming from the viewer on the live streaming selection screen, it generates the streaming request including the stream ID of the selected live streaming and transmits to the Server 210 via the network. The streaming info unit 2302 may start to provide the live streaming, which is specified by the stream ID in the streaming request, to the user terminal 30. The streaming info unit 2302 may update the stream DB 2320 to add the viewer's viewer ID of the user terminal 30 to the livestreamer ID of the stream ID.

The relay unit 2304 may relay the transmission of the live streaming from the user terminal 20 of the livestreamer to the user terminal 30 of the viewer in the live streaming started by the streaming info unit 2302. The relay unit 2304 may receive the signal, which indicates the user input from the viewer, from the input transmit unit 2206 while the streaming data is reproducing. The signal indicating the user input may be the object-designated signal which indicates the designation of the object shown on the display of the user terminal 30. The object-designated signal may include the viewer ID of the viewer, the livestreamer ID of the livestreamer, who delivers the live streaming the viewer is viewing, and object ID specified by the object. If the object is a gift or the like, the object ID may be the gift ID or the like. Similarly, the relay unit 2304 may receive the signal indicating the user input of the livestreamer, for example the object-designated signal, from the streaming unit 1100 of the user terminal 20 while the streaming data is reproducing.

The processing unit 2306 may be configured to realize the communication and data processing in or among different portions of the live streaming system 1. For example, the processing unit 2306 may manage information in the short-term memory DB 2326 and long-term memory DB 2328, do the emotion recognition to trigger the corresponding motion, convert the text data or audio data into each other or the like.

In some embodiments, the processing unit 2306 may receive the conversation in the live streaming room and then store the messages in the short-term memory DB 2326. The processing unit 2306 may store a specific amount of latest messages in the live streaming room. In some embodiments, the processing unit 2306 may remove old messages in the short-term memory DB 2326 to keep the latest messages in the short-term memory DB 2326. For example, the latest ten messages may be kept in the short-term memory DB 2326, and the old messages may be removed periodically or the like.

In some embodiments, the processing unit 2306 may further feed the information in the short-term memory DB 2326 into a machine learning model of the AI V-Liver. According to the embodiments, the AI V-Liver may have the information on the latest conversation with the viewers and the conversation between AI V-Liver and the viewers may be smoother. Moreover, the old conversation may not be kept in the short-term memory DB 2326, so the storages may be released and the AI V-Liver may act like a real person such as forgetting things or the like. Therefore, the user experience may be improved.

In some embodiments, the processing unit 2306 may detect keywords in the comments from the viewers and then store the keywords associated with the viewers in the long-term memory DB 2328. The processing unit 2306 may store the keywords related to the viewer. The keywords may be the information of the viewer such as birthday, star sign, nickname or the like.

In some embodiments, the processing unit 2306 may detect the keywords related to the topic of the AI V-Liver and then associate with the viewer to be stored in the long-term memory DB 2328. For example, if the topic of the AI V-Liver is an astrology, the processing unit 2306 may associate the star sign from viewer's comments with the viewer and then store it in the long-term memory DB 2328. In some embodiments, the processing unit 2306 may further feed the information in the long-term memory DB 2328 into a machine learning model of the AI V-Liver.

According to the embodiments, the AI V-Liver may have the information on the viewers who they used to talk with, which may facilitate the conversation between AI V-Liver and the viewers smoothly. Moreover, the information on the viewers may not need to be provided the second time, so the conversation may be facilitated smoothly and the AI V-Liver may act like a real person such as remembering things or the like. Therefore, the user experience may be improved.

In some embodiments, the processing unit 2306 may determine emotion on the response generated from a machine learning model of the AI V-Liver. In some embodiments, the processing unit 2306 may feed the response to a machine learning model such as the emotion recognition portion 550 to determine emotion of the response. The processing unit 2306 may determine whether the emotion on the response is positive, neutral or negative such as happy, calm, angry or the like.

In some embodiments, the processing unit 2306 may further determine a motion or a combination of motions corresponding to the emotions. For example, if the emotion is positive or happy, a motion of smile, dance or the combination may be determined. In some embodiments, the motions may be determined via a look-up table, machine learning technology or the like. In some embodiments, the processing unit 2306 may further trigger the motions of the AI V-Liver via an API or the like. For example, if the emotion of response is positive, a motion file in the AI V-Liver model such as Live2D may be triggered and displayed on the AI V-Liver.

According to the embodiments, the AI V-Liver may have motions with emotion while communicating with the viewers and the conversation between AI V-Liver and the viewers may be smoother. Moreover, the motions on the AI V-Liver may change according to the emotion of the response, so the conversation may be facilitated smoothly and the AI V-Liver may act like a real person such as behaving happy, angry or the like. Therefore, the user experience may be improved.

In some embodiments, the processing unit 2306 may convert the response from text data into audio data or the like. In some embodiments, the processing unit 2306 may feed the response to a text to speech unit such as the TTS portion 530 to convert the response into audio file. The processing unit 2306 may convert the response into an audio file such as .wav file or the like. In some embodiments, the processing unit 2306 may further transmit the audio data, text data or the like to the broadcast portion 520. In some embodiments, the audio data may be played while the corresponding motions are performed by the AI V-Liver. In some embodiments, the text data may be displayed as a subtitle in the live streaming room.

In some embodiments, the response, audio data of the response, emotion of the response and the corresponding motion may be transmitted to the live streaming room. In some embodiments, the motion may be triggered on the virtual chatbot while the audio data is being played. In some embodiments, the motion may be triggered on the virtual chatbot while the response is being displayed. In some embodiments, the response may be displayed as subtitles in the live streaming room while the audio data is being played. In some embodiments, the rendering and generating of the streaming data in the live streaming room may be realized flexibly according to the practical need.

In some embodiments, a speech to text unit may also be applied if, for example, the viewer's comments are audio data or the like. In some embodiments, the voice of the AI V-Liver may be any available resources or may be trained via machine learning technology. In some embodiments, the voice may be trained via the machine learning model from a user in the live streaming platform, a celebrity, a person with specific personality, genre or the like. For example, the voice may be trained like a cute Japanese girl or strong Indian guy or the like.

According to the embodiments, the response from the AI V-Liver may have subtitles while communicating with the viewers and the conversation between AI V-Liver and the viewers may be smoother. Moreover, the AI V-Liver may respond to the viewers via audio data, so the conversation may be facilitated smoothly and the AI V-Liver may act like a real person such as speaking or the like. Therefore, the user experience may be improved.

FIG. 31 shows an exemplary data structure of the stream DB 2320 of FIG. 30. The stream DB 2320 holds information regarding a live stream currently taking place. The stream DB 2320 stores a stream ID for identifying a live-stream on a live distribution platform provided by the live streaming system 1, a livestreamer ID for identifying the livestreamer who provides the live-stream, and a viewer ID for identifying a viewer of the live-stream, in association with each other.

FIG. 32 shows an exemplary data structure of the user DB 2322 of FIG. 30. The user DB 2322 holds information regarding users. The user DB 2322 stores a user ID for identifying a user, points for identifying the points the user accumulates, level for identifying the level of the user and status for identifying the status of the user in association with each other. The point is the electronic value circulated within the live-streaming platform. The level may be an indicator of the amount of user activity or engagement on the live streaming platform. The status may be an identity or membership status of the user on the live streaming platform.

FIG. 33 shows an exemplary data structure of the AI V-Liver DB 2324 of FIG. 30. The AI V-Liver DB 2324 holds information regarding an AI V-Liver live streaming currently taking place. The AI V-Liver DB 2324 stores an AI V-Liver ID for identifying an AI V-Liver, a topic for identifying topic of the AI V-Liver, a name for identifying the name of the AI V-Liver, a motion ID for identifying the motion of the AI V-Liver, a motion description for identifying description of the motion, a URL for identifying location of the AI V-Liver model, in association with each other.

In some embodiments, the topic of the AI V-Liver may be the conversations the AI V-Liver mainly focuses on. For example, the topic may be astrology if the setting of the AI V-Liver is an astrologer, and the topic may be politics if the setting of the AI V-Liver is a politician. In some embodiments, the name of the AI V-Liver may be displayed in the live streaming room such as the object 602 in FIG. 28. The motion ID and motion description may be corresponding to a facial expression, body movement or the combination of the AI V-Liver such as smiling, dancing, running or the like. The URL may indicate location of the AI V-Liver model and the AI V-Liver model may include the file of the AI V-Liver such as the Live2D model, VRM model or the like.

In some embodiments, live streams from the AI V-Liver may also be stored in the stream DB 2320 or a separate DB. In some embodiments, information of the AI V-Liver may also be stored as a user in the user DB 2322 or a separate DB. In some embodiments, the details of each database may be determined flexibly according to the practical need.

FIG. 34 shows an exemplary data structure of the short-term memory DB 2326 of FIG. 30. The short-term memory DB 2326 holds information regarding conversations in a live streaming room. The short-term memory DB 2326 stores a message ID for identifying a message in a conversation between the viewers and AI V-Liver, a description for identifying the contents of the message in the conversation, in association with each other.

In some embodiments, the short-term memory DB 2326 may store the conversation from the viewer side, the AI V-Liver side or both of them. In some embodiments, the short-term memory DB 2326 may store a specific amount of conversation, for example, the latest ten messages in the live streaming room. In some embodiments, the information to be stored in the short-term memory DB 2326 may be determined flexibly according to the practical need.

FIG. 35 shows an exemplary data structure of the long-term memory DB 2328 of FIG. 30. The long-term memory DB 2328 holds information with keywords associated with a viewer in a live streaming room. The long-term memory DB 2328 stores a memory ID for identifying a long-term memory associated with a viewer, a user ID for identifying the viewer associated by the keyword, data type for identifying the data type of the keyword, data info for identifying the information of the data and format for identifying the association of the keyword and the viewer, in association with each other.

In some embodiments, the keyword to be stored in the long-term memory DB 2328 may be information related to the viewer. For example, the keyword may be the birthday, star sign or nickname of the viewer. In some embodiments, the keyword may also be information related to the topic of the AI V-Liver. For example, the keyword may be the star sign of the viewer if the topic of the AI V-Liver is an astrologer or the like.

FIG. 36 shows an exemplary data structure of the emotion analysis model 2330 of FIG. 30. The emotion analysis model 2330 may be an internal language model or a language model provided by third-party such as Google, OpenAI or the like. For example, the emotion analysis model 2330 may be BERT such as bert-base-chinese, GPT or the like. The training data for the emotion analysis model 2330 may be the historical data in Server 210 or dataset provided by third-party or the like. For example, the dataset of MPDD (Multi-Party Dialogue Dataset) or CPED (Chinese personalized and emotional dialogue dataset) may be used for training the emotion analysis model 2330.

In some embodiments, the trained emotion analysis model 2330 may be used to determine emotion of the response. The response from the AI V-Liver may be fed into the emotion analysis model 2330. As shown in FIG. 36, the emotion of the response may be generated according to the emotion analysis model 2330. For example, if the viewer sends an image of a cockroach, the AI V-Liver may respond with “cockroaches are so disgusting, get away from me”. The response may be fed into the emotion analysis model 2330, and an emotion of “angry” may be inferred from the response.

FIG. 37 shows an exemplary data structure of motion look-up table 2332 of FIG. 30. The motion look-up table 2332 holds information regarding an emotion and its corresponding motion. The motion look-up table 2332 stores an emotion for identifying an emotion of the AI V-Liver, a motion ID for identifying the motion to be triggered by the emotion, in association with each other.

In some embodiments, the emotion may be a positive, neutral or negative emotion such as happy, calm, angry or the like. In some embodiments, the motion may be a facial expression or body movement such as smiling, hand waving or the like. In some embodiments, the emotion may be one or combination of more than one emotion, and the motion may also be one or combination of more than one motion. For example, the AI V-Liver may laugh and dance if the emotion is happy and excited.

Figure 38:
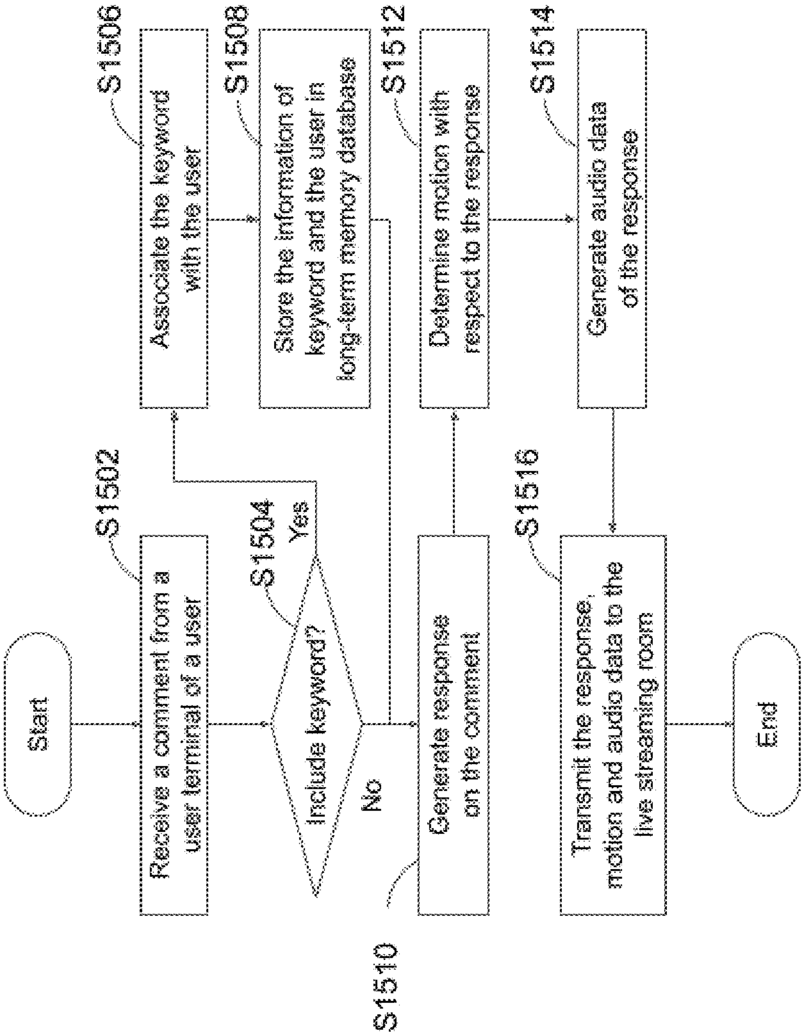
FIG. 38 is a flowchart showing steps of an application activation process on the live streaming system 1 according to some embodiments of subject application.

The operation of live streaming system 1 with the above configuration will be now described. FIG. 38 is a flowchart showing steps of an application activation process on the live streaming system 1 according to some embodiments of subject application. Once a user enters a live streaming room, the user may perform an operation by the user terminal to interact with the AI V-Liver. In some embodiments, the operation may include sending messages, sending gifts, following, unfollowing, voting, gaming or the like.

The Server 210 may receive a comment from a user terminal of a user (S1502). The processing unit 2306 may monitor the message by detecting a keyword in the message. For example, the processing unit 2306 may scan the message to detect whether it contains a specific keyword. In some embodiments, the keyword may be information related to the viewer such as birthday, star sign, nickname or the like. In some embodiments, the keyword may also be information related to the AI V-Liver and the viewer. For example, if the topic of the AI V-Liver is a politician, the keyword may be the party the viewer supports or the like.

If the message includes a specific keyword (Yes in S1504), the processing unit 2306 may associate the keyword with the user (S1506). More specifically, the processing unit 2306 may extract the user ID, data type and data information, and then transfer into a specific format for storage. For example, the processing unit 2306 may extract the "Chris", "star sign" and "Taurus" and then transfer into key-value format such as json format or the like to be stored in a database. In some embodiments, the format may be any possible format type that may be stored in or be retrieved from the database.

In some embodiments, the keyword and the association with the user may be detected by a machine learning model or the like. The machine learning model may be used to determine whether the keyword is associated with the viewer. For example, if the viewer says that "I am a Taurus" or "My friend is a Taurus". Even if both messages include the keyword of "Taurus", the former one may indicate that the viewer is a Taurus, however, the latter one may not provide any information associated with the user. The machine learning model may distinguish the difference and determine the association or not.

In some embodiments, the processing unit 2306 may further store the information of the keyword and the user in a long-term memory database 2328 (S1508). In some embodiments, the information in the long-term memory database 2328 may further be fed into a machine learning model of the AI V-Liver, and the response may be generated further based on the information in the long-term memory database 2328.

The comment from the user terminal of the user may further be fed into a machine learning model to generate response on the comment (S1510). In some embodiments, the response may be generated according to a plurality of parameters such as daily emotion of the AI-V-Liver, short-term memory database 2326, long-term memory database 2328, comments from the viewers, status in the live streaming room or the like.

The processing unit 2306 may further determine motion with respect to the response (S1512). In some embodiments, the response may include positive, neutral, negative emotion such as happy, calm, angry or the like. The motion of AI-V-Liver such as facial expressions or body movements may be corresponding to different emotions. In some embodiments, the processing unit 2306 may feed the response into a machine learning model to determine emotion of response. The processing unit 2306 may further determine motion of the AI-V-Liver according to the emotion of response.

The processing unit 2306 may further generate audio data of the response via the TTS portion 530 (S1514). The processing unit 2306 may further transmit the response, motion and audio data to the live streaming room (S1516). In some amendments, the response may be displayed as a subtitle in the live streaming room. The motion may be displayed via the virtual skin of the AI V-Liver and the audio data may be played synchronously with the motion to show the interaction with the viewer in the live streaming room.

In some embodiments, the present disclosure may include the following embodiments:

1. A method for replying to comments, executed by a server, comprising: obtaining a first comment; obtaining a second comment; obtaining parameters of the first comment; obtaining parameters of the second comment; determining a first priority score of the first comment according to the parameters of the first comment; determining a second priority score of the second comment according to the parameters of the second comment; and selecting the first comment or the second comment to reply to according to the first priority score and the second priority score.
2. The method further comprising: determining the first priority score to be greater than the second priority score; and transmitting a first reply to the first comment before transmitting a second reply to the second comment.
3. The method further comprising: wherein the parameters of the first comment include a length of the first comment, and the first priority score is determined to be greater when the length of the first comment is longer.
4. The method further comprising: wherein the parameters of the first comment include a time length between a current timing and a last timing of a last reply to a first viewer who made the first comment, and the first priority score is determined to be greater when the time length is shorter.
5. The method further comprising: wherein the parameters of the first comment include a topic similarity score of the first comment, and the first priority score is determined to be greater when the topic similarity score is greater, and the topic similarity score increases as the first comment is more relevant to a last reply, wherein the last reply is transmitted before obtaining the first comment.
6. The method further comprising: generating a simulation comment with respect to the last reply; calculating a first correlation coefficient between the simulation comment and the first comment; and determining the topic similarity score to be greater when the first correlation coefficient is greater.
7. The method further comprising: wherein the generating the simulation comment with respect to the last reply includes inputting the last reply into an LLM model.
8. The method further comprising: wherein the method is for a virtual character to reply to the comments in a live stream, and the first comment and the second comment are from different viewers in the live stream.
9. A system for replying to comments, comprising one or a plurality of processors, wherein the one or plurality of processors execute a machine-readable instruction to perform: obtaining a first comment; obtaining a second comment; obtaining parameters of the first comment; obtaining parameters of the second comment; determining a first priority score of the first comment according to the parameters of the first comment; determining a second priority score of the second comment according to the parameters of the second comment; and selecting the first comment or the second comment to reply to according to the first priority score and the second priority score.

10. A non-transitory computer-readable medium including a program for replying to comments, wherein the program causes one or a plurality of computers to execute: obtaining a first comment; obtaining a second comment; obtaining parameters of the first comment; obtaining parameters of the second comment; determining a first priority score of the first comment according to the parameters of the first comment; determining a second priority score of the second comment according to the parameters of the second comment; and selecting the first comment or the second comment to reply to according to the first priority score and the second priority score.

11. A method for providing live streams in a live streaming platform, comprising: generating a virtual chatbot via a machine learning model; determining an emotion of the virtual chatbot; feeding information of the emotion into the machine learning model; and setting the virtual chatbot in a live streaming room.

12. The method further comprising: wherein the emotion is determined by randomly selecting a context event prompt and a context score from an event list; and the event list includes one or more context event prompts describing events the virtual chatbot encounters and the event score indicates an emotion score of the event.

13. The method further comprising: wherein the emotion is determined according to a day in a week; the day in a week includes a week event prompt and a week score; and the week event prompt describes a sentence related to the day in a week and the week score indicates an emotion score of the sentence.

14. The method further comprising: wherein the emotion is determined according to a stock price; a change in the stock price corresponds to a stock event prompt and stock score; and the stock event prompt describes a sentence related to the stock price and the stock score indicates an emotion score of the sentence.

15. The method further comprising calculating an overall emotion score for the emotion; determining an overall emotion prompt according to the overall emotion score; and feeding the overall emotion prompt into the machine learning model.

16. The method further comprising: wherein the stock event prompt is generated in response to the change satisfying a specific condition.

17. The method further comprising receiving a comment from a user in the live streaming room; generating a response on the comment via the machine learning model; and transmitting the response to the live streaming room.

18. The method further comprising: wherein the emotion is determined in each minute, hour, daytime, nighttime, day, week, month or year.

19. A server comprising a circuitry, wherein the circuitry is configured to perform: generating a virtual chatbot via a machine learning model; determining an emotion of the virtual chatbot; feeding information of the emotion into the machine learning model; and setting the virtual chatbot in a live streaming room.

20. A non-transitory computer-readable medium including program instructions, that when executed by one or more processors, cause the one or more processors to execute: generating a virtual chatbot via a machine learning model; determining an emotion of the virtual chatbot; feeding information of the emotion into the machine learning model; and setting the virtual chatbot in a live streaming room.

21. A method for providing live streams in a live streaming platform, comprising: generating a virtual chatbot via a machine learning model; setting the virtual chatbot in a live streaming room; receiving a comment from a user in the live streaming room; storing a keyword associated with the user in a first database in response to the keyword being detected from the comment; and feeding information of the first database into the machine learning model; wherein the keyword is related to information on the user.

22. The method further comprising: setting a topic on the virtual chatbot; wherein the keyword is further related to the topic of the virtual chatbot; the keyword related to the topic is further associated with the user and then stored in the first database.

23. The method further comprising: storing the comment in a second database; and feeding information of the second database into the machine learning model; wherein the second database stores a specific amount of the latest conversation in the live streaming room.

24. The method further comprising: generating a response on the comment via the machine learning model; and transmitting the response to the live streaming room.

25. The method further comprising: determining a motion on the response; converting the response to audio data in format; and triggering the motion on the virtual chatbot while the audio data is being played.

26. The method further comprising: determining a motion on the response; and triggering the motion on the virtual chatbot while the response is being displayed.

27. The method further comprising: converting the response to audio data in format; and displaying the response as subtitle in the live streaming room while the audio data is being played.

28. The method further comprising: generating a response in response to the user entering the live streaming room, in response to the user sending the comment or in response to no interaction in the live streaming room over a specific period of time.

29. A server comprising a circuitry, wherein the circuitry is configured to perform: generating a virtual chatbot via a machine learning model: setting the virtual chatbot in a live streaming room; receiving a comment from a user in the live streaming room; storing a keyword associated with the user in a first database in response to the keyword being detected from the comment; and feeding information of the first database into the machine learning model; wherein the keyword is related to information on the user.

30. A non-transitory computer-readable medium including program instructions, that when executed by one or more processors, cause the one or more processors to execute: generating a virtual chatbot via a machine learning model; setting the virtual chatbot in a live streaming room; receiving a comment from a user in the live streaming room; storing a keyword associated with the user in a first database in response to the keyword being detected from the comment; and feeding information of the first database into the machine learning model; wherein the keyword is related to information on the user.

Figure 16:
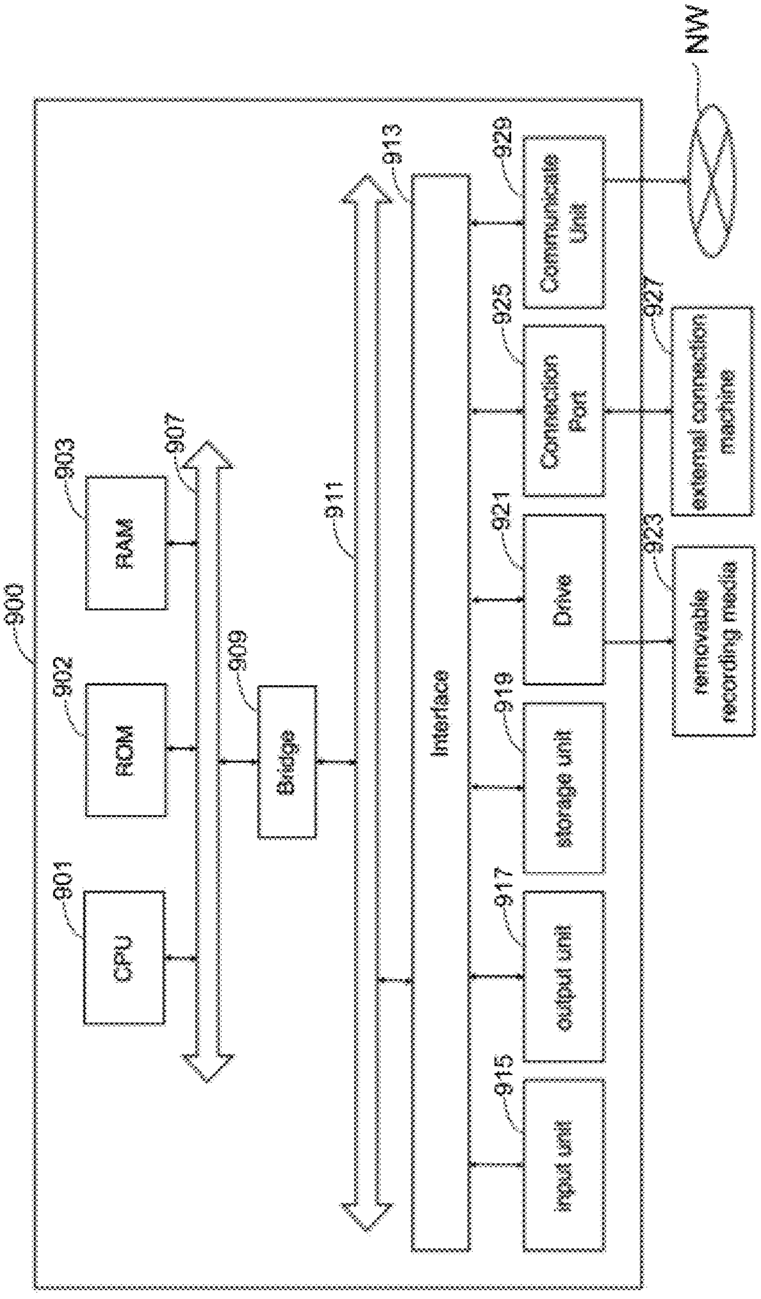
FIG. 16 is a block diagram showing an example of a hardware configuration of the information processing device according to some embodiments of the present disclosure.

FIG. 16 is a schematic block diagram of computer hardware for carrying out a system configuration and processing according to some embodiments of subject application. The information processing device 900 in FIG. 16 is, for example, is configured to realize the Server 10, 110 and 210 and the user terminal 20, 30 respectively according to some embodiments of subject application.

The information processing device 900 includes a CPU 901, read only memory (ROM) 902, and random-access memory (RAM) 903. In addition, the information processing device 900 may include a host bus 907, a bridge 909, an external bus 911, an interface 913, an input unit 915, an output unit 917, a storage unit 919, a drive 921, a connection port 925, and a communication unit 929. The information processing device 900 may include imaging devices (not shown) such as cameras or the like. The CPU 901 is an example of hardware configuration to realize various functions performed by the components described herein. The functions described herein may be realized by circuitry programmed to realize such functions described herein. The circuitry programmed to realize such functions described herein includes a central processing unit (CPU), a digital signal processor (DSP), a general-use processor, a dedicated processor, an integrated circuit, application specific integrated circuits (ASICs) and/or combinations thereof. Various units described herein as being configured to realize specific functions, including but not limited to the distribution unit 100, viewing unit 200, image capturing control unit 102, audio control unit 104, video transmission unit 106, a distributor-side UI control unit 108, viewer-side UI control unit 202, superimposed information generation unit 204, input information transmission unit 206, distribution information providing unit 302, a relay unit 304, a gift processing unit 306, a payment processing unit 308, a stream DB 310, a user DB 312, a gift DB 314, a video generating unit 320, an audio generating unit 322, a character DB 324, a language model DB 326, an obtaining unit 330, a processing unit 332, a determining unit 334, a transmitting unit 336, a comment DB 338, a reply DB 340, streaming unit 1100, the viewing unit 1200, the video control unit 1102, the audio control unit 1104, the distribution unit 1106, the UI control unit 1108, the UI control unit 1202, the rendering unit 1204, the input transmit unit 1206, the streaming info unit 1302, the relay unit 1304, the processing unit 1306, the stream DB 1320, the user DB 1322, the AI V-Liver DB 1324, the streaming info unit 2302, the relay unit 2304, the processing unit 2306, the stream DB 2320, the user DB 2322, the AI V-Liver DB 2324, the short-term memory DB 2326, the long-term memory DB 2328 and so on, may be embodied as circuitry programmed to realize such functions.

The CPU 901 functions as an arithmetic processing device and a control device, and controls the overall operation or a part of the operation of the information processing device 900 according to various programs recorded in the ROM 902, the RAM 903, the storage unit 919, or a removable recording medium 923. For example, the CPU 901 controls overall operations of respective function units included in the Server 10, 110 and 210 and the user terminal 20 and 30 of the above-described embodiment. The ROM 902 stores programs, operation parameters, and the like used by the CPU 901. The RAM 903 transiently stores programs used when the CPU 901 is executed, and parameters that change as appropriate when executing such programs. The CPU 901, the ROM 902, and the RAM 903 are connected with each other via the host bus 907 configured from an internal bus such as a CPU bus or the like. The host bus 907 is connected to the external bus 911 such as a Peripheral Component Interconnect/Interface (PCI) bus via the bridge 909.

The input unit 915 is a device operated by a user such as a mouse, a keyboard, a touchscreen, a button, a switch, and a lever. The input unit 915 may be a device that converts physical quantity to electrical signal such as audio sensor (such as microphone or the like), acceleration sensor, tilt sensor, infrared radiation sensor, depth sensor, temperature sensor, humidity sensor or the like. The input unit 915 may be a remote-control device that uses, for example, infrared radiation and another type of radio waves. Alternatively, the input unit 915 may be an external connection machine 927 such as a mobile phone that corresponds to an operation of the information processing device 900. The input unit 915 includes an input control circuit that generates input signals on the basis of information which is input by a user to output the generated input signals to the CPU 901. The user inputs various types of data and indicates a processing operation to the information processing device 900 by operating the input unit 915.

The output unit 917 includes a device that can visually or audibly report acquired information to a user. The output unit 917 may be, for example, a display device such as an LCD, a PDP, and an OLED, an audio output device such as a speaker and a headphone, and a printer. The output unit 917 outputs a result obtained through a process performed by the information processing device 900, in the form of text or video such as an image, or sounds such as audio sounds.

The storage unit 919 is a device for data storage that is an example of a storage unit of the information processing device 900. The storage unit 919 includes, for example, a magnetic storage device such as a hard disk drive (HDD), a semiconductor storage device, an optical storage device, or a magneto-optical storage device. The storage unit 919 stores therein the programs and various data executed by the CPU 901, and various data acquired from an outside.

The drive 921 is a reader/writer for the removable recording medium 923 such as a magnetic disk, an optical disc, a magneto-optical disk, and a semiconductor memory, and built in or externally attached to the information processing device 900. The drive 921 reads out information recorded on the mounted removable recording medium 923, and outputs the information to the RAM 903. The drive 921 writes the record into the mounted removable recording medium 923.

The connection port 925 is a port used to directly connect devices to the information processing device 900. The connection port 925 may be a Universal Serial Bus (USB) port, an IEEE1394 port, or a Small Computer System Interface (SCSI) port, for example. The connection port 925 may also be an RS-232C port, an optical audio terminal, a High-Definition Multimedia Interface (HDMI (registered trademark)) port, and so on. The connection of the external connection machine 927 to the connection port 925 makes it possible to exchange various kinds of data between the information processing device 900 and the external connection machine 927.

The communication unit 929 is a communication interface including, for example, a communication device for connection to a communication network NW. The communication unit 929 may be, for example, a wired or wireless local area network (LAN), Bluetooth (registered trademark), or a communication card for a wireless USB (WUSB).

The communication unit 929 may also be, for example, a router for optical communication, a router for asymmetric digital subscriber line (ADSL), or a modem for various types of communication. For example, the communication unit 929 transmits and receives signals on the Internet or transmits signals to and receives signals from another communication device by using a predetermined protocol such as TCP/IP. The communication network NW to which the communication unit 929 connects is a network established through wired or wireless connection. The communication network NW is, for example, the Internet, a home LAN, infrared communication, radio wave communication, or satellite communication.

The imaging device (not shown) is a device that images real space using an imaging device such as a charge coupled device (CCD) or a complementary metal oxide semiconductor (CMOS), for example, and various members such as a lens for controlling image formation of a subject image on the imaging device and generates a captured image. The imaging device may capture a still picture or may capture a movie.

The present disclosure of the live streaming system 1 has been described with reference to embodiments. The above-described embodiments have been described merely for illustrative purposes. Rather, it can be readily conceived by those skilled in the art that various modifications may be made in making various combinations of the above-described components or processes of the embodiments, which are also encompassed in the technical scope of the present disclosure.

The procedures described herein, particularly flowchart or those described with a flowchart, are susceptible of omission of part of the steps constituting the procedure, adding steps not explicitly included in the steps constituting the procedure, and/or reordering the steps. The procedure subjected to such omission, addition, or reordering is also included in the scope of the present disclosure unless diverged from the purport of the present disclosure.

In some embodiments, at least a part of the functions performed by the Server 10, 110 and 210 may be performed by other than the server 10, 110 and 210, for example, being performed by the user terminal 20 or 30. In some embodiments, at least a part of the functions performed by the user terminal 20 or 30 may be performed by other than the user terminal 20 or 30, for example, being performed by the server 10, 110 and 210. In some embodiments, the rendering of the frame image may be performed by the user terminal of the viewer, the server, the user terminal of the livestreamer or the like.

Furthermore, the system and method described in the above embodiments may be provided with a computer-readable non-transitory storage device such as a solid-state memory device, an optical disk storage device, or a magnetic disk storage device, or a computer program product or the like. Alternatively, the programs may be downloaded from a server via the Internet.

Although technical content and features of the present disclosure are described above, a person having common knowledge in the technical field of the present disclosure may still make many variations and modifications without disobeying the teaching and disclosure of the present disclosure. Therefore, the scope of the present disclosure is not limited to the embodiments that are already disclosed but includes another variation and modification that do not disobey the present disclosure, and is the scope covered by the following patent application scope.

We claim:

1. A method for providing live streams in a live streaming platform, comprising:

generating a virtual chatbot via a machine learning model;

determining an emotion of the virtual chatbot based on one or more predefined models;

feeding information of the emotion into the machine learning model, wherein the information of the emotion comprises an emotion prompt that is a sentence or paragraph with instructions of a certain emotion; and setting the virtual chatbot in a live streaming room;

wherein the emotion is determined according to a stock price;

a change in the stock price corresponds to a stock event prompt and stock score; and the stock event prompt describes a sentence related to the stock price and the stock score indicates an emotion score of the sentence.

2. The method according to claim 1, wherein the emotion is further determined by randomly selecting a context event prompt and a context score from an event list; and the event list includes one or more context event prompts describing events the virtual chatbot encounters and the context score indicates an emotion score of the event.

3. The method according to claim 1, wherein the emotion is further determined according to a day in a week;

the day in a week includes a week event prompt and a week score; and the week event prompt describes a sentence related to the day in a week and the week score indicates an emotion score of the sentence.

4. The method according to claim 2, further comprising calculating an overall emotion score for the emotion;

determining an overall emotion prompt according to the overall emotion score; and feeding the overall emotion prompt into the machine learning model.

5. The method according to claim 3, further comprising calculating an overall emotion score for the emotion;

determining an overall emotion prompt according to the overall emotion score; and feeding the overall emotion prompt into the machine learning model.

6. The method according to claim 1, further comprising calculating an overall emotion score for the emotion;

determining an overall emotion prompt according to the overall emotion score; and feeding the overall emotion prompt into the machine learning model.

7. The method according to claim 1, wherein the stock event prompt is generated in response to the change satisfying a specific condition.

8. The method according to claim 1, further comprising receiving a comment from a user in the live streaming room;

generating a response on the comment via the machine learning model; and transmitting the response to the live streaming room.

9. The method according to claim 1, wherein the emotion is determined in each minute, hour, daytime, nighttime, day, week, month or year.

10. A server comprising a circuitry, wherein the circuitry is configured to perform:

generating a virtual chatbot via a machine learning model;

determining an emotion of the virtual chatbot based on one or more predefined models;

feeding information of the emotion into the machine learning model, wherein the information of the emotion comprises an emotion prompt that is a sentence or paragraph with instructions of a certain emotion; and setting the virtual chatbot in a live streaming room;

wherein the emotion is determined according to a stock price;

a change in the stock price corresponds to a stock event prompt and stock score; and the stock event prompt describes a sentence related to the stock price and the stock score indicates an emotion score of the sentence.

11. A non-transitory computer-readable medium including program instructions, that when executed by one or more processors, cause the one or more processors to execute:

generating a virtual chatbot via a machine learning model;

determining an emotion of the virtual chatbot based on one or more predefined models;

feeding information of the emotion into the machine learning model, wherein the information of the emotion comprises an emotion prompt that is a sentence or paragraph with instructions of a certain emotion; and setting the virtual chatbot in a live streaming room;

wherein the emotion is determined according to a stock price;

a change in the stock price corresponds to a stock event prompt and stock score; and the stock event prompt describes a sentence related to the stock price and the stock score indicates an emotion score of the sentence.

* * * * *